(12) United States Patent
Nakata et al.

(10) Patent No.: US 7,108,896 B2
(45) Date of Patent: Sep. 19, 2006

(54) METHOD OF INCREASING HELICAL TWISTING POWER, OPTICALLY ACTIVE COMPOUND, LIQUID CRYSTAL COMPOSTION CONTAINING THE SAME, AND LIQUID CRYSTAL DISPLAY DEVICE

(75) Inventors: Hidetoshi Nakata, Ageo (JP); Makoto Sasaki, Saitama (JP); Kiyofumi Takeuchi, Tokyo (JP); Haruyoshi Takatsu, Tokyo (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 153 days.

(21) Appl. No.: 10/601,803

(22) Filed: Jun. 24, 2003

(65) Prior Publication Data

US 2004/0021128 A1 Feb. 5, 2004

(30) Foreign Application Priority Data

Jun. 28, 2002 (JP) ............................ P2002-189821
Sep. 30, 2002 (JP) ............................ P2002-285617

(51) Int. Cl.
C09K 19/36 (2006.01)
C09K 19/52 (2006.01)
C07C 69/76 (2006.01)
C07C 69/74 (2006.01)

(52) U.S. Cl. ............... 428/1.1; 252/299.01; 252/299.7; 560/55; 560/64; 560/65; 560/76; 560/83; 560/127; 560/128

(58) Field of Classification Search ........... 252/299.01, 252/299.7; 428/1.1; 560/55, 64, 65, 76, 560/83, 127, 128
See application file for complete search history.

(56) References Cited

FOREIGN PATENT DOCUMENTS

| JP | 5-52298 | 8/1993 |
| JP | 7-33354 | 4/1995 |
| JP | 9-217062 | 8/1997 |

OTHER PUBLICATIONS

CAPLUS 1969 438186.*
CAPLUS 1991: 229195.*
CAPLUS 1992: 20960.*
Masaki Oiwa, et al., Preliminary Manuscript of the 2001 Conference of the Japanese Liquid Crystal Society, 2001, pp. 421-422.
Takeshi Koike, et al., Preliminary Manuscript of the 1999 Conference of the Japanese Liquid Crystal Society, 1990, pp. 220-221.

Chinese Office Action dated Apr. 28, 2006, in counterpart application.

* cited by examiner

Primary Examiner—Shean C. Wu
(74) Attorney, Agent, or Firm—Armstrong, Kratz, Quintos, Hanson & Brooks, LLP

(57) ABSTRACT

A method of increasing helical twisting power (HTP) in an optically active compound used in a liquid crystal material is provided. An optically active compound which exhibits a large HTP value is also provided. Furthermore, a liquid crystal composition which exhibits a high upper temperature limit of the liquid crystal after the addition of the optically active compound, and a liquid crystal display device using the same are provided. In a method, an HTP of a compound having a partial structure represented by formula (A), which has an asymmetric carbon atom, is increased by replacing the partial structure represented by formula (A) by a partial structure represented by formula (B)

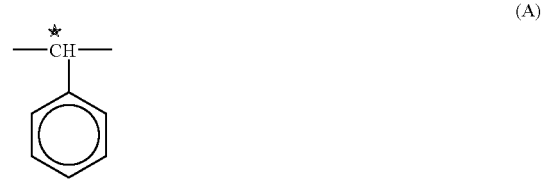

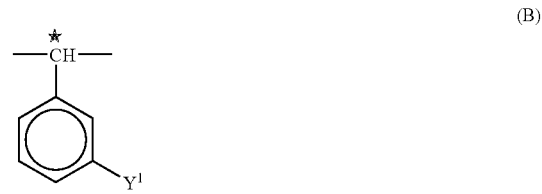

(wherein * represents the position of an asymmetric carbon atom, $Y^1$ represents a substituent such as an alkyl group and a halogen).

A compound is represented by formula (I):

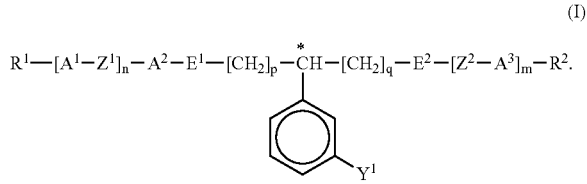

22 Claims, No Drawings

METHOD OF INCREASING HELICAL TWISTING POWER, OPTICALLY ACTIVE COMPOUND, LIQUID CRYSTAL COMPOSTION CONTAINING THE SAME, AND LIQUID CRYSTAL DISPLAY DEVICE

BACKGROUND OF THE INVENTION

1. Field of the Invention

The present invention relates to a method of increasing helical twisting power (HTP) in an optically active compound employed in a liquid crystal display device, an optically active compound, a liquid crystal composition containing the compound, and a liquid crystal display device using the same.

2. Description of Related Art

In liquid crystal materials for use in TN (twisted nematic) type, STN (super twisted nematic) type and phase transition type (cholesteric) devices, an optically active compound having a liquid crystal skeleton is added to induce a twisted orientation. It is known that a natural pitch P (μm) decreases when an additive concentration C (% by weight) of the optically active compound increases and that a good relationship of the product of P and C being constant is established in the case of low concentration C ranging from about 1 to several % by weight. The reciprocal of the relationship, i.e., a helical twisting power HTP (1/μm) (HTP=1/(P×0.01C) is used as a parameter for evaluation of a power for inducing the twisted orientation peculiar to the optically active compound.

Heretofore, as the optically active compound, a compound (product name: S-811) represented by the formula (VI-a):

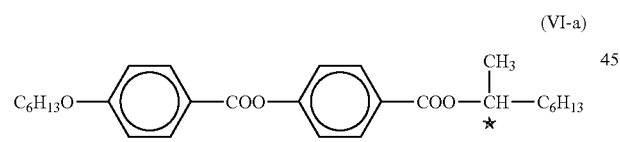

(VI-a)

a compound (product name: CB-15) represented by the formula (VI-b):

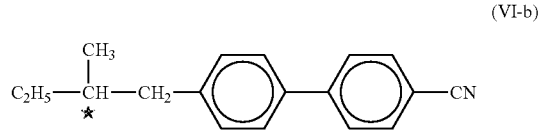

(VI-b)

and a compound (product name: cholesteryl nonanate CN) represented by the formula (VI-c):

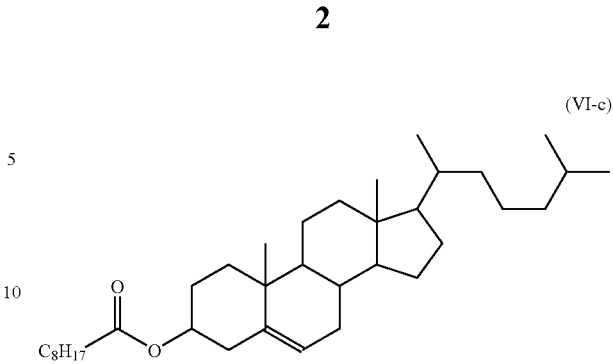

(VI-c)

have commonly been used; however, they had small HTP values, for example, 10.5, 8.4 and 5.2 (as the HTP value, we use a value obtained by measuring at 25° C. after adding 1% by weight of the optically active compound to the following liquid crystal composition (XII-a)).

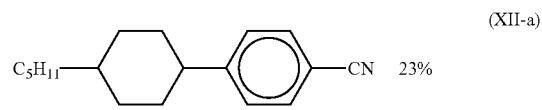

(XII-a)

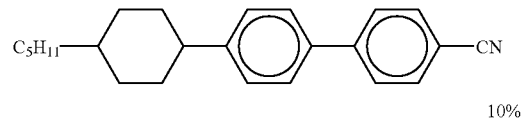

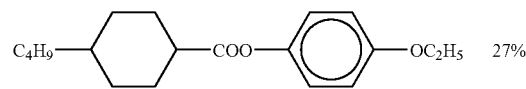

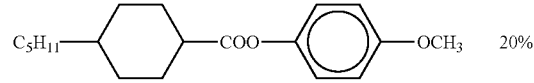

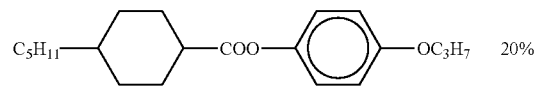

When using such an optically active compound having a small HTP value, it becomes necessary to add a large amount of the optically active compound to obtain a desired natural pitch, thereby causing problems such as increase in viscosity of the liquid crystal material and narrow temperature range of the liquid crystal. Thus, an optically active compound having a larger HTP value is required.

In the case of a cholesteric liquid crystal composition, since the pitch must be controlled within a range from about 0.1 to 2 μm so as to obtain a selective reflection wavelength in the infrared or visible range, the additive concentration of the optically active compound increases to 10 to 20% by weight. Since the upper temperature limit of the liquid crystal is drastically lowered when the additive concentration of the optically active compound increases, an optically active compound having a large HTP value has been required.

As a means for solving these problems, an optically active compound represented by the formula (VI-d):

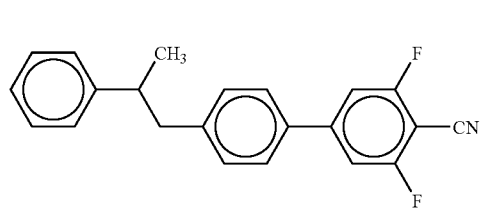

(see Oiwa, Preliminary Manuscript of the 2001 Conference of the Japanese Liquid Crystal Society, 2001, p. 421–422), an optically active compound represented by the formula (VI-e):

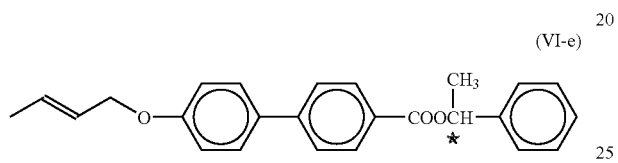

(see Japanese Examined Patent Application, Second Publication No. Hei 7-33354 (claim 3)) and an optically active compound represented by the formula (VI-f):

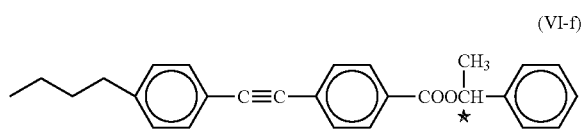

(see Japanese Examined Patent Application, Second Publication No. Hei 5-52298 (claim 3)) are disclosed. These compounds have a structure having a phenyl group adjacent to an asymmetric carbon and have a large HTP value as compared with optically active compounds such as compounds represented by the formulas (VI-a), (VI-b) and (VI-c). However, the HTP value of these compounds is not sufficient to solve the problems described above, and therefore, a compound having a larger HTP value or a method of increasing the HTP value has been required.

A comparison in HTP between a structure having a substituent at the para-position of the end of these compounds and a structure having no substituent is made (see Koike, Preliminary Manuscript of the 1999 Conference of the Japanese Liquid Crystal Society, 1990, p. 220–221). The documents described above disclose that the HTP value decreases when the substituent is introduced at the para-position, and it was considered that the structure having a substituent at the end phenyl group is disadvantageous in view of the HPT value.

BRIEF SUMMARY OF THE INVENTION

An object of the present invention is to provide a method of increasing HTP in an optically active compound used as a liquid crystal material, an optically active compound which exhibits a larger HTP value, a liquid crystal composition having a high upper temperature limit of the liquid crystal after the addition of the optically active compound, and a liquid crystal display device using the same.

To achieve the above objects, the present inventors have intensively researched taking notice of the chemical structure of an optically active compound and found that HTP can be increased by introducing a substituent at a specific portion of the optically active compound. Thus, the present invention has been completed.

The present invention provides a method of increasing HTP as described below.

That is, the present invention provides a method of increasing a helical twisting power HTP (1/μm):

$$HTP=1/(P \times 0.01C)$$

where C represents an amount (% by weight) of an optically active compound and P represents a natural pitch (μm) in a compound having a partial structure represented by the formula (A):

wherein * represents the position of an asymmetric carbon atom, which has an asymmetric carbon atom, said method comprising replacing a partial structure represented by the above formula (A) by a partial structure represented by the formula (B):

wherein * represents the position of an asymmetric carbon atom, and $Y^1$ represents an alkyl group having 1 to 10 carbon atoms, an alkenyl group having 2 to 10 carbon atoms, a fluorine atom, a chlorine atom, a bromine atom, an iodine atom, a cyano group or an isothiocyanate group, the alkyl group or the alkenyl group is not substituted or can have one, or two or more fluorine atoms, chlorine atoms, cyano groups, methyl groups or trifluoromethyl groups as a substituent, and one, or two or more methylene groups existing in the alkyl group or the alkenyl group may be substituted with —CO— or may be substituted with an oxygen atom or —COO— in such a manner that oxygen atoms are not directly bonded to each other.

Furthermore, the present invention provides an optically active compound, a liquid crystal composition containing the compound and a liquid crystal display device described below.

That is, the present invention provides an optically active compound represented by the general formula (I):

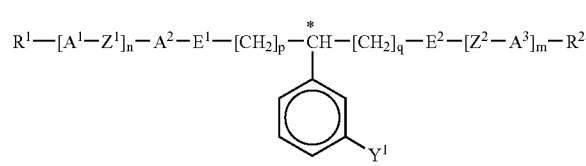

wherein * represents the position of an asymmetric carbon, $R^1$ and $R^2$ each independently represents an alkyl group having 1 to 10 carbon atoms, an alkenyl group having 2 to 10 carbon atoms, a hydrogen atom, a fluorine atom, a chlorine atom, a bromine atom, an iodine atom, a cyano group or an isothiocyanate group, the alkyl group or the alkenyl group is not substituted or can have one, or two or more fluorine atoms, chlorine atoms, cyano groups, methyl groups or trifluoromethyl groups as a substituent, and one, or two or more methylene groups existing in the alkyl group or the alkenyl group may be substituted with —CO— or may be substituted with an oxygen atom or —COO— in such a manner that oxygen atoms are not directly bonded to each other, $A^1$, $A^2$ and $A^3$ each independently represents a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a 1,2,3,4-tetrahydronaphthalene-2,6-diyl group, a 2,6-naphthylene group, an indane-2,5-diyl group, a phenanthrene-2,7-diyl group, a 9,10-dihydrophenanthrene-2,7-diyl group, a 1,2,3,4,4a,9,10a-octahydrophenanthrene-2,7-diyl group or a fluorene-2,7-diyl group, and the 1,4-phenylene group, the 1,2,3,4-tetrahydronaphthalene-2,6-diyl group, the 2,6-naphthylene group, phenanthrene-2,7-diyl group, the 9,10-dihydrophenanthrene-2,7-diyl group, the 1,2,3,4,4a,9,10a-octahydrophenanthrene-2,7-diyl group and the fluorene-2,7-diyl group are not substituted or can have one, or two or more fluorine atoms, chlorine atoms, trifluoromethyl groups, trifluoromethoxy groups or methyl groups as a substituent, $Z^1$ and $Z^2$ each independently represents a single bond, —CO—, —COO—, —OCO—, —CH=N—, —N=CH—, —C≡C—, —CH$_2$CH$_2$—, —CH$_2$CH$_2$CH$_2$—, —CH$_2$CH$_2$CH$_2$CH$_2$—, —CH$_2$O—, —OCH$_2$—, —CF$_2$O—, —OCF$_2$—, —CH=N—N=CH—, —CF=CF—, —CH=CH—, —CH$_2$CH$_2$CH=CH—, —CH=CHCH$_2$CH$_2$— or —CH$_2$CH=CHCH$_2$—, $Y^1$ represents an alkyl group having 1 to 10 carbon atoms, an alkenyl group having 2 to 10 carbon atoms, a fluorine atom, a chlorine atom, a bromine atom, an iodine atom, a cyano group or an isothiocyanate group, the alkyl group or the alkenyl group is not substituted or can have one, two or more fluorine atoms, chlorine atoms, cyano groups, methyl groups or trifluoromethyl groups as a substituent, and one, or two or more methylene groups existing in the alkyl group or the alkenyl group may be substituted with —CO— or may be substituted with an oxygen atom or —COO— in such a manner that oxygen atoms are not directly bonded to each other, $E^1$ and $E^2$ each independently represents a single bond, —O—, —CO—, —COO—, —OCO—, —CH$_2$—, —CH$_2$CH$_2$—, —CH$_2$O—, —OCH$_2$—, —COCH$_2$—, —CH$_2$CO—, —COOCH$_2$—, —OCOCH$_2$—, —CH$_2$COO— or —CH$_2$OCO—, m, n, p and q each independently represents 0, 1 or 2 and, when n represents 2, the two groups $A^1$ or the two groups $Z^2$ may be the same or different, and when m represents 2, the two groups $Z^2$ or the two groups $A^3$ may be the same or different, and any oxygen atom in $E^2$ and any oxygen atom in $Z^2$ are not adjacent to each other.

The present invention also provides a liquid crystal composition comprising 0.01% by weight to 50% by weight of the optically active compound, and a liquid crystal display device using the same.

According to the present invention, HTP could be increased by replacing the partial structure of an optically active compound and an optically active compound having a large HTP value could be obtained. By using the optically active compound of the present invention, a liquid crystal composition having a high upper temperature limit of the liquid crystal could be obtained. A liquid crystal display device using the liquid crystal composition is very useful and practical as liquid crystal displays including TN, STN or active driving liquid crystal display device and cholesteric liquid crystal display device.

DETAILED DESCRIPTION OF THE INVENTION

An example of the present invention will be described below.

The method of increasing HTP of the present invention is characterized by replacing the partial structure of the formula (A) by the partial structure of the formula (B). In the formula (B), $Y^1$ preferably represents an alkyl group having 1 to 5 carbon atoms, an alkenyl group having 2 to 5 carbon atoms (the alkyl group or the alkenyl group is not substituted or can have one, two or more fluorine atoms, chlorine atoms, cyano groups, methyl groups or trifluoromethyl groups as a substituent, and one, or two or more methylene groups existing in the alkyl group or the alkenyl group may be substituted with an oxygen atom in such a manner that oxygen atoms are not directly bonded to each other), a fluorine atom, a chlorine atom, a bromine atom or a cyano group, more preferably represents an alkyl group having 1 to 3 carbon atoms, an alkoxy group having 1 to 3 carbon atoms, an alkenyl group having 2 to 3 carbon atoms, an alkenyloxy group having 2 to 3 carbon atoms (the alkyl group, the alkenyl group, the alkoxy group or the alkenyloxy group is not substituted or can have one, two or more fluorine atoms or chlorine atoms as a substituent), a fluorine atom, a chlorine atom or a bromine atom, and most preferably represents a methyl group, a methoxy group, a trifluoromethyl group or a trifluoromethoxy group.

The compound of the present invention is characterized by having a substituent at the meta-position of a phenyl group adjacent to an asymmetric carbon. In the general formula (I), $Y^1$ as the substituent at the meta-position preferably represents an alkyl group having 1 to 5 carbon atoms or an alkenyl group having 2 to 5 carbon atoms (the alkyl group or the alkenyl group is not substituted or can have one, two or more fluorine atoms, chlorine atoms, cyano groups, methyl groups or trifluoromethyl groups as a substituent, and one, or two or more methylene groups existing in the alkyl group or the alkenyl group may be substituted with an oxygen atom in such a manner that oxygen atoms are not directly bonded to each other), a fluorine atom, a chlorine atom, a bromine atom or a cyano group, more preferably represents an alkyl group having 1 to 3 carbon atoms, an alkoxy group having 1 to 3 carbon atoms, an alkenyl group having 2 to 3 carbon atoms or an alkenyloxy group having 2 to 3 carbon atoms (the alkyl group, the alkenyl group, the alkoxy group or the alkenyloxy group is not substituted or can have one, two or more fluorine atoms or chlorine atoms as a substituent), a fluorine atom, a chlorine atom or a bromine atom, and most preferably represents a methyl group, a methoxy group, a trifluoromethyl group or a trifluoromethoxy group.

It is preferable that $R^1$, $R^2$, $A^1$, $A^2$, $A^3$, $Z^1$, $Z^2$, $E^1$, $E^2$, n, m, p and q in the general formula (I) are appropriately selected according to the purposes of the optically active compound.

In the case in which compatibility is important, low viscosity and stability of the compound, the compound is preferably a compound represented by the general formula (VI-g):

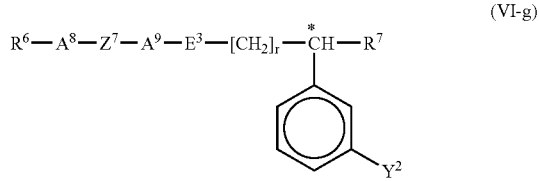

wherein * represents the position of an asymmetric carbon, $Y^2$ represents an alkyl group having 1 to 3 carbon atoms, an alkoxy group having 1 to 3 carbon atoms, an alkenyl group having 2 to 3 carbon atoms, an alkenyloxy group having 2 to 3 carbon atoms (the alkyl group, the alkenyl group, the alkoxy group or the alkenyloxy group is not substituted or can have one, two or more fluorine atoms or chlorine atoms as a substituent), a fluorine atom, a chlorine atom or a bromine atom, $R^6$ represents an alkyl group having 1 to 10 carbon atoms or an alkenyl group having 2 to 10 carbon atoms, the alkyl group or the alkenyl group is not substituted or can have one, two or more fluorine atoms, chlorine atoms, cyano groups, methyl groups or trifluoromethyl groups as a substituent, and one, or two or more methylene groups existing in the alkyl group or the alkenyl group may be substituted with —CO— or may be substituted with an oxygen atom or —COO— in such a manner that oxygen atoms are not directly bonded to each other, $R^7$ represents an alkyl group having 1 to 3 carbon atoms or an alkenyl group having 2 to 3 carbon atoms, the alkyl group or the alkenyl group is not substituted or can have one, two or more fluorine atoms, chlorine atoms, cyano groups, methyl groups or trifluoromethyl groups as a substituent, and one, or two or more methylene groups existing in the alkyl group or the alkenyl group may be substituted with —CO— or may be substituted with an oxygen atom or —COO— in such a manner that oxygen atoms are not directly bonded to each other, $A^8$ and $A^9$ each independently represents a 1,4-phenylene group, a 1,4-cyclohexylene group, a decahydronaphthalene-2,6-diyl group, a pyrimidine-2,5-diyl group, a 1,2,3,4-tetrahydronaphthalene-2,6-diyl group or a 2,6-naphthylene group, and the 1,4-phenylene group, the 1,2,3,4-tetrahydronaphthalene-2,6-diyl group and the 2,6-naphthylene group are not substituted or can have one, or two or more fluorine atoms, chlorine atoms, trifluoromethyl groups, trifluoromethoxy groups or methyl groups as a substituent, $E^3$ represents a single bond, —O—, —CO—, —COO—, —OCO—, —CH$_2$—, —CH$_2$CH$_2$—, —CH$_2$O—, —OCH$_2$—, —COCH$_2$—, —CH$_2$CO—, —COOCH$_2$—, —OCOCH$_2$—, —CH$_2$COO— or —CH$_2$OCO—, $Z^7$ represents a single bond, —COO—, —OCO—, —C≡C—, —CH$_2$CH$_2$—, —CH$_2$O—, —OCH$_2$—, —CH═N—N═CH—, —CF═CF— or —CH═CH—, and r represents 0, 1 or 2.

In the general formula (VI-g), $Y^2$ preferably represents a fluorine atom, a methyl group, a methoxy group, a trifluoromethyl group or a trifluoromethoxy group, $R^6$ preferably represents an alkyl group having 1 to 5 carbon atoms or an alkenyl group having 2 to 6 carbon atoms (one, or two or more methylene groups existing in the alkyl group or the alkenyl group may be substituted with an oxygen atom in such a manner that oxygen atoms are not directly bonded to each other), $R^7$ preferably represents a methyl group or a trifluoromethyl group, and more preferably represents a methyl group, $A^8$ and $A^9$ preferably represent a 1,4-phenylene group or a 1,4-cyclohexylene group, $E^3$ preferably represents —CH$_2$—, —O—, —CO—, —COO—, —OCO—, —CH$_2$CH$_2$—, —CH$_2$O—, —OCH$_2$—, —COCH$_2$—, —CH$_2$CO—, —COOCH$_2$— or —OCOCH$_2$—, and more preferably represents —CH$_2$— or —COO—, $Z^7$ preferably represents a single bond, —COO— or —OCO—, and more preferably represents a single bond, and r preferably represents 0.

Preferred is a compound represented by the general formula (VI-g) wherein $Y^2$ represents a fluorine atom, a methyl group, a methoxy group, a trifluoromethyl group or a trifluoromethoxy group, $R^6$ represents an alkyl group having 1 to 5 carbon atoms or an alkenyl group having 2 to 6 carbon atoms, $R^7$ represents a methyl group, $A^8$ and $A^9$ each independently represents a 1,4-phenylene group or a 1,4-cyclohexylene group, $E^3$ represents —CH$_2$— or —COO—, $Z^7$ represents a single bond and r represents 0.

In the case in which high refractive index anisotropy is required, in addition to compatibility, low viscosity and stability, $Z^7$ preferably represents —C≡C—. In this case, preferred is a compound represented by the general formula (VI-g) wherein $Y^2$ represents a fluorine atom, a methyl group, a methoxy group, a trifluoromethyl group or a trifluoromethoxy group, $R^6$ represents an alkyl group having 1 to 5 carbon atoms or an alkenyl group having 2 to 6 carbon atoms, $R^7$ represents a methyl group, $A^8$ and $A^9$ each independently represents a 1,4-phenylene group or a 1,4-cyclohexylene group, $E^3$ represents —CH$_2$— or —COO—, $Z^7$ represents —C≡C— and r represents 0.

Specific compounds are particularly preferably compounds represented by the following general formulas (VII-1) to (VII-32):

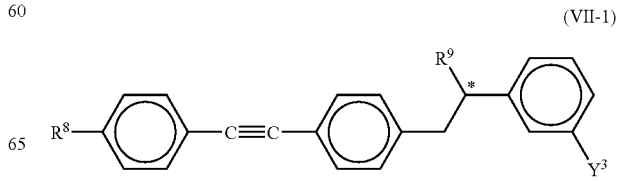

-continued
(VII-2)
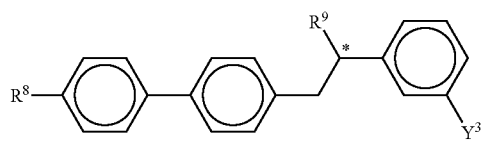
(VII-3)
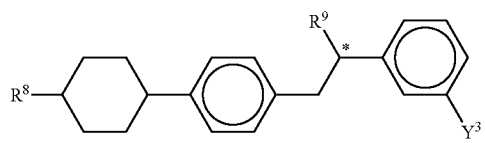
(VII-4)
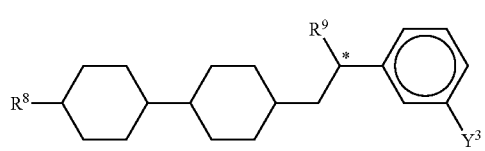
(VII-5)
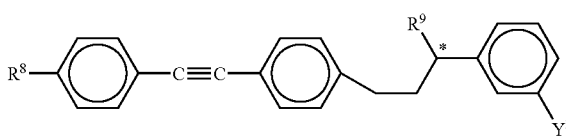
(VII-6)
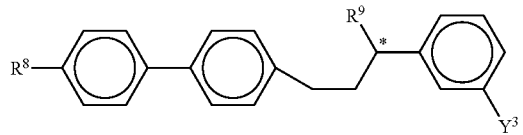
(VII-7)
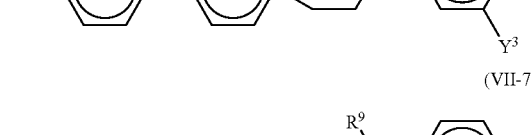
(VII-8)
(VII-9)
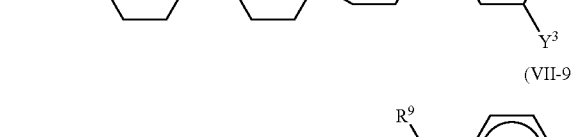
(VII-10)
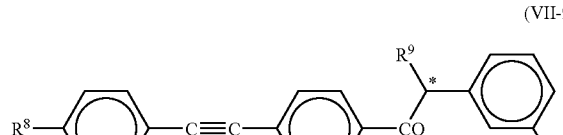
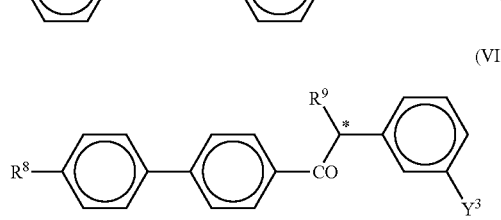
-continued
(VII-11)
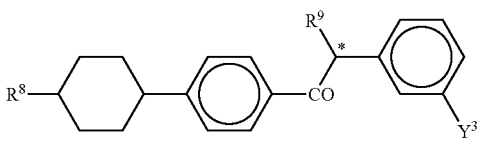
(VII-12)
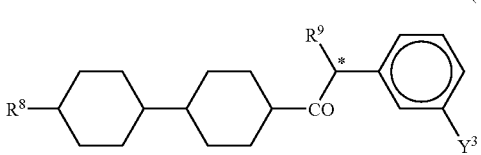
(VII-13)
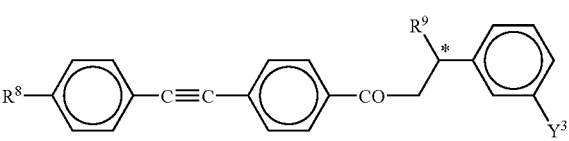
(VII-14)
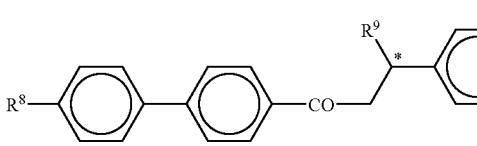
(VII-15)
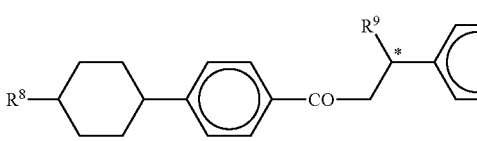
(VII-16)
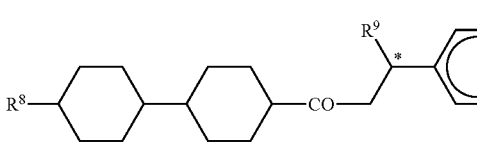
(VII-17)
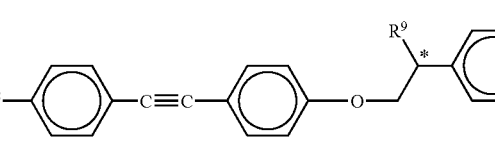
(VII-18)
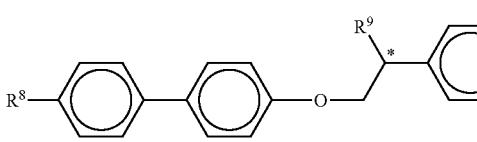
(VII-19)
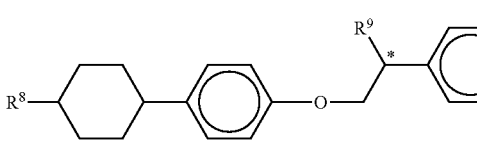

(VII-20)
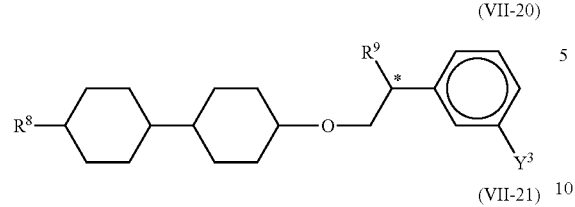

(VII-21)
(VII-22)
(VII-23)
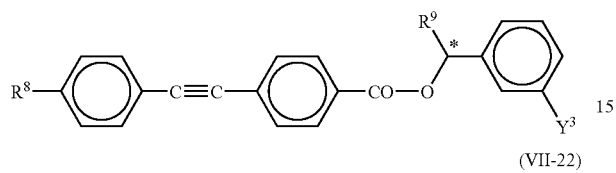

(VII-24)
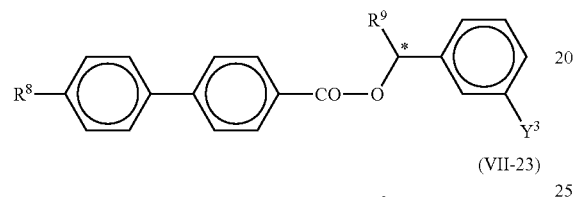

(VII-25)
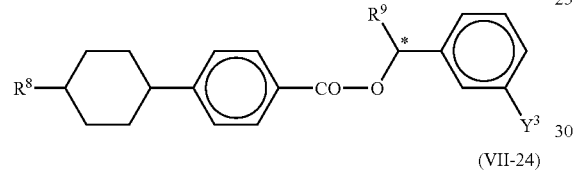

(VII-26)
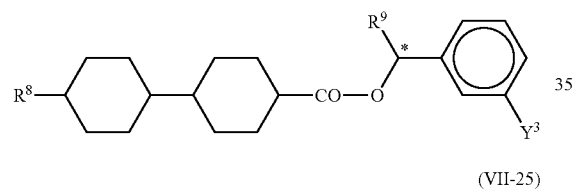

(VII-27)
(VII-28)
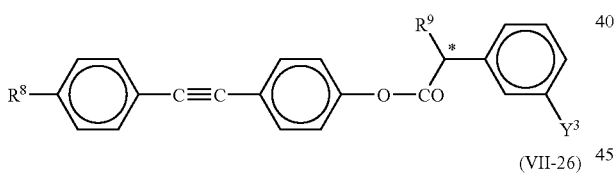

(VII-29)
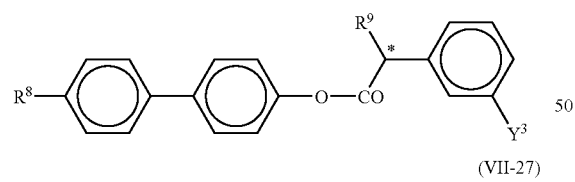

(VII-30)
(VII-31)
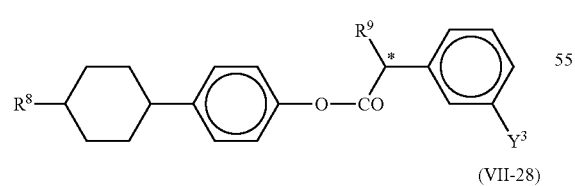

(VII-32)
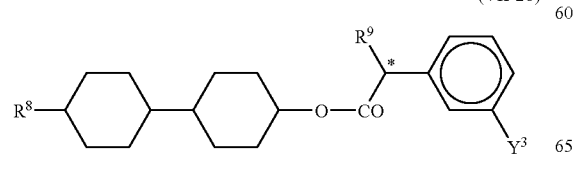

wherein * represents the position of an symmetric carbon, $Y^3$ represents a methyl group, a methoxy group, a trifluoromethyl group, a trifluoromethoxy group or a fluorine atom, $R^8$ represents an alkyl group having 1 to 5 carbon atoms, an alkoxy group having 1 to 5 carbon atoms, an alkenyl group having 2 to 5 carbon atoms, an alkenyloxy group having 2 to 5 carbon atoms or the formula (VII-m):

(VII-m)

(this structural formula is bonded to the ring at the right end), and $R^9$ represents a methyl group or a trifluoromethyl group.

In the case in which $R^8$ represents an alkenyl group or an alkenyloxy group in the general formulas (VII-1) to (VII-32), it is preferably represented by any of the following structural formulas (VII-n):

(VII-n)
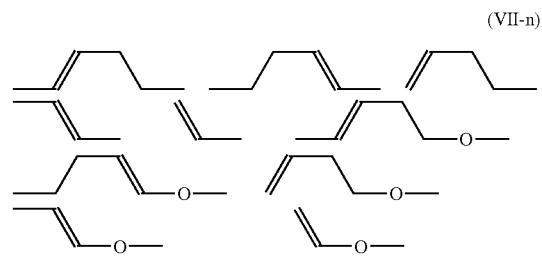

(the structural formula is bonded to the ring at the right end).

Compounds represented by the general formulas (VII-21), (VII-22) and (VII-23) wherein $R^8$ represents a methyl group are preferable, and a compound represented by the general formula (VII-22) wherein $R^8$ represents a methyl group is particularly preferable.

In the case in which a compound having large $\Delta\epsilon$ is required, preferred is a compound represented by the general formula (VI-h):

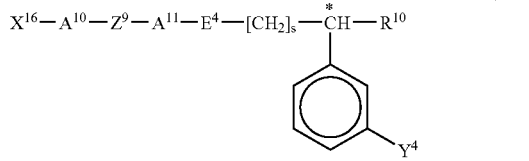

(VI-h)

wherein * represents the position of an asymmetric carbon, $Y^4$ represents an alkyl group having 1 to 3 carbon atoms, an alkoxy group having 1 to 3 carbon atoms, an alkenyl group having 2 to 3 carbon atoms, an alkenyloxy group having 2 to 3 carbon atoms (the alkyl group, the alkenyl group, the alkoxy group and the alkenyloxy group are not substituted or can have one, or two or more fluorine atoms or chlorine atoms as a substituent), a fluorine atom, a chlorine atom or a bromine atom, $X^{16}$ represents an alkyl group having 1 to 5 carbon atoms, an alkoxy group having 1 to 5 carbon atoms, a cyano group, a fluorine atom, a chlorine atom, a trifluoromethoxy group, a difluoromethoxy group or an isothiocyanate group, $R^{10}$ represents an alkyl group having 1 to 3 carbon atoms or an alkenyl group having 2 to 3 carbon atoms, the alkyl group or the alkenyl group is not substituted or can have one, two or more fluorine atoms, chlorine atoms, cyano groups, methyl groups or trifluoromethyl groups as a substituent, and one, or two or more methylene groups existing in the alkyl group or the alkenyl group may be substituted with —CO— or may be substituted with an oxygen atom or —COO— in such a manner that oxygen atoms are not directly bonded to each other, $A^{10}$ and $A^{11}$ each independently represents a 1,4-phenylene group, a 1,4-cyclohexylene group, a decahydronaphthalene-2,6-diyl group, a pyrimidine-2,5-diyl group, a 1,2,3,4-tetrahydronaphthalene-2,6-diyl group or a 2,6-naphthylene group, and the 1,4-phenylene group, the 1,2,3,4-tetrahydronaphthalene-2,6-diyl group and the 2,6-naphthylene group are not substituted or can have one, or two or more fluorine atoms, chlorine atoms, trifluoromethyl groups, trifluoromethoxy groups or methyl groups as a substituent, $E^4$ represents a single bond, —O—, —CO—, —COO—, —OCO—, —CH$_2$—, —CH$_2$CH$_2$—, —CH$_2$O—, —OCH$_2$—, —COCH$_2$—, —CH$_2$CO—, —COOCH$_2$—, —OCOCH$_2$—, —CH$_2$COO— or —CH$_2$OCO—, $Z^9$ represents a single bond, —COO—, —OCO—, —C≡C—, —CH$_2$CH$_2$—, —CH$_2$O—, —OCH$_2$—, —CH=N—N=CH—, —CF=CF— or —CH=CH—, and s represents 0, 1 or 2.

In the case in which a compound having a large absolute value of dielectric constant anisotropy is required and is used in a composition suited for use in a display element which is driven without using an active element, in the general formula (VI-h), $Y^4$ preferably represents a fluorine atom, a methyl group, a methoxy group, a trifluoromethyl group or a trifluoromethoxy group, $R^{10}$ preferably represents a methyl group or a trifluoromethyl group, and more preferably represents a methyl group, at least one of $A^{10}$ and $A^{11}$ preferably represents a structure selected from the group of partial structural formulas represented by the general formula (VI-i):

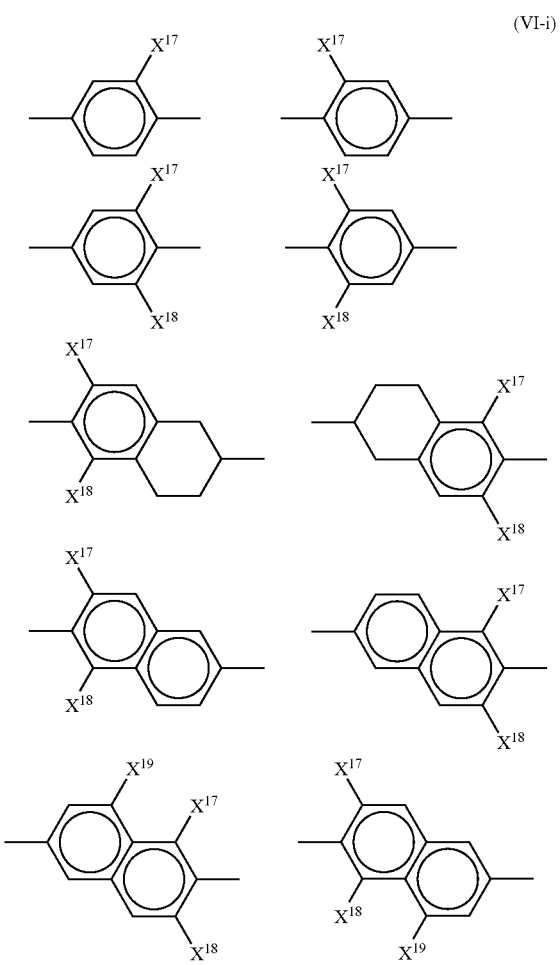

(VI-i)

wherein $X^{17}$ to $X^{19}$ each independently represents a hydrogen atom, a fluorine atom or a chlorine atom, and more preferably represents a structure selected from the group of structural formulas of the general formula (VI-j):

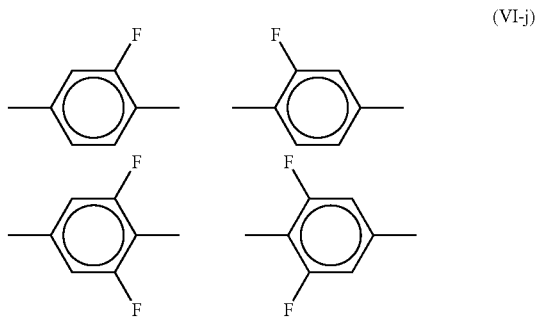

(VI-j)

$E^4$ preferably represents —$CH_2$—, —O—, —CO—, —COO—, —OCO—, —$CH_2CH_2$—, —$CH_2O$—, —$OCH_2$—, —$COCH_2$—, —$CH_2CO$—, —$COOCH_2$— or —$OCOCH_2$—, and more preferably represents —$CH_2$— or —COO—, $Z^9$ preferably represents a single bond, —COO— or —OCO—, $X^{16}$ preferably represents a cyano group, and s preferably represents 0.

More preferred is a compound wherein $Y^4$ represents a fluorine atom, a methyl group, a methoxy group, a trifluoromethyl group or a trifluoromethoxy group, $R^{10}$ represents a methyl group, at least one of $A^{10}$ and $A^{11}$ represents a structure selected from the group of structural formulas of the general formula (VI-j), $Z^9$ represents a single bond, —COO— or —OCO—, $E^4$ represents —$CH_2$— or —COO—, $X^{16}$ represents a cyano group and s represents 0.

In the case in which a compound having a large absolute value of dielectric constant anisotropy and large refractive index anisotropy is required and is used in a composition suited for use in a display element which is driven without using an active element, preferred is a compound wherein $Y^4$ represents a fluorine atom, a methyl group, a methoxy group, a trifluoromethyl group or a trifluoromethoxy group, $R^{10}$ represents a methyl group, at least one of $A^{10}$ and $A^{11}$ represents a structure selected from the group of structural formulas of the general formula (VI-j), $Z^9$ represents —C≡C—, $E^4$ represents —$CH_2$— or —COO—, $X^{16}$ represents a cyano group and s represents 0.

Specific compounds are particularly preferably compounds represented by the following general formulas (VII-33) to (VII-68):

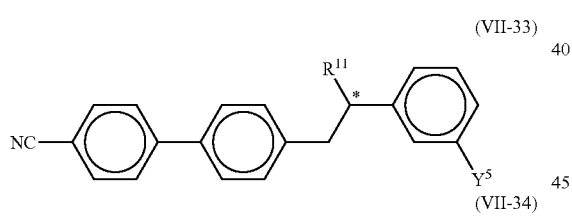
(VII-33)

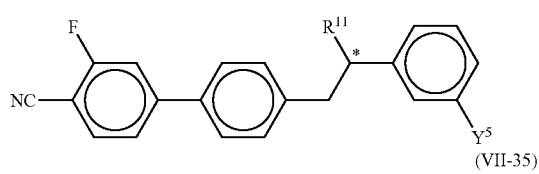
(VII-34)

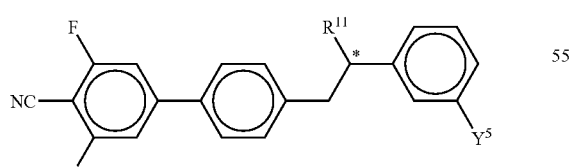
(VII-35)

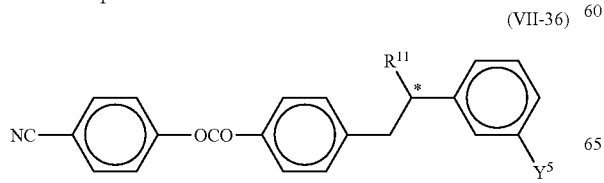
(VII-36)

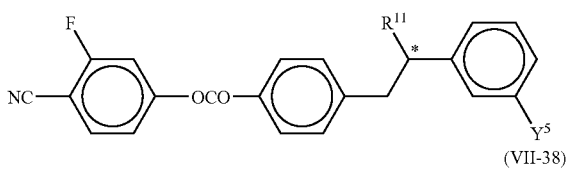
(VII-37)

(VII-38)

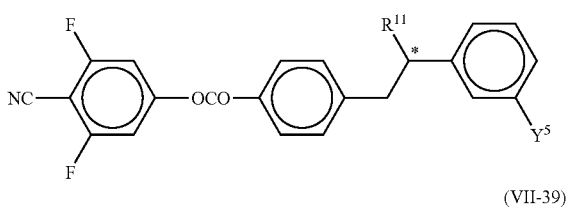
(VII-39)

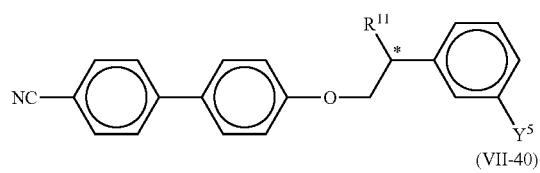
(VII-40)

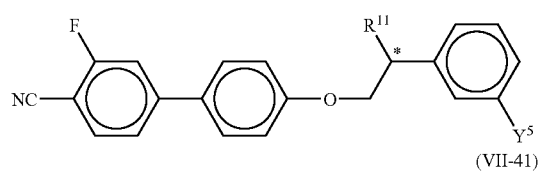
(VII-41)

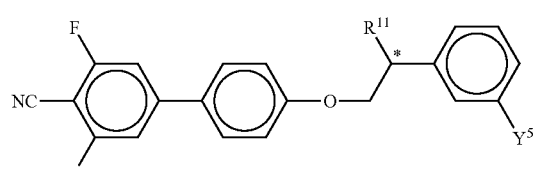
(VII-42)

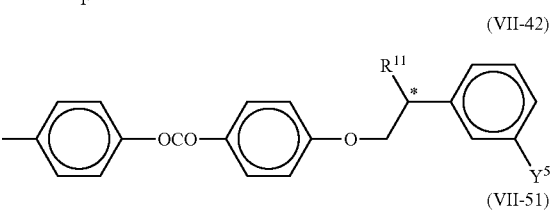
(VII-51)

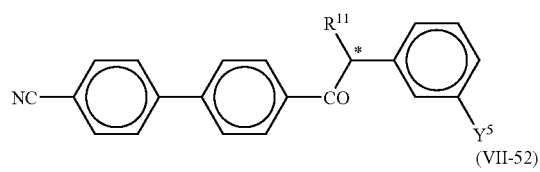
(VII-52)

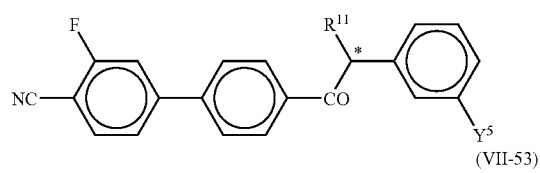
(VII-53)

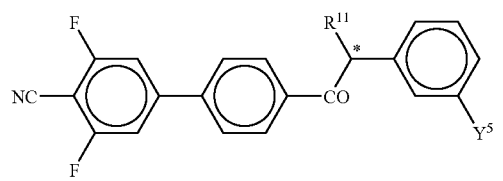

-continued (VII-54), (VII-55), (VII-56), (VII-57), (VII-58), (VII-59), (VII-60)

wherein * represents the position of an asymmetric carbon, $R^{11}$ represents a methyl group or a trifluoromethyl group, and $Y^5$ represents a methyl group, a methoxy group, a trifluoromethyl group or a trifluoromethoxy group, and (VII-43)

-continued (VII-44), (VII-45), (VII-46), (VII-47), (VII-48), (VII-49), (VII-50), (VII-61), (VII-62)

-continued

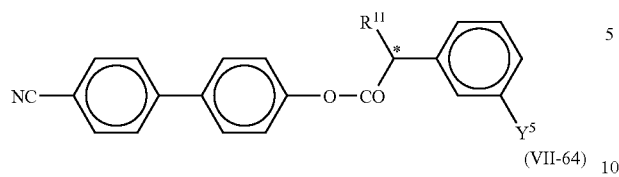
(VII-63)

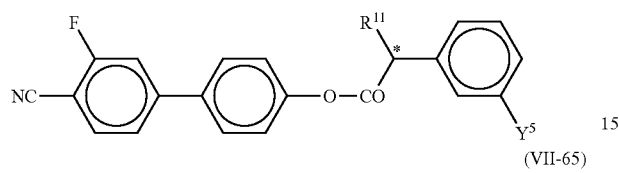
(VII-64)

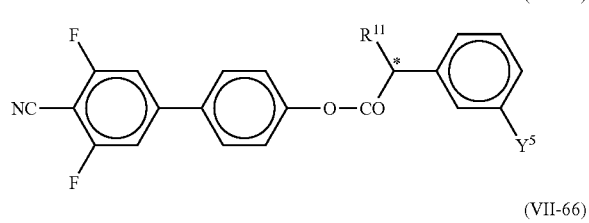
(VII-65)

(VII-66)

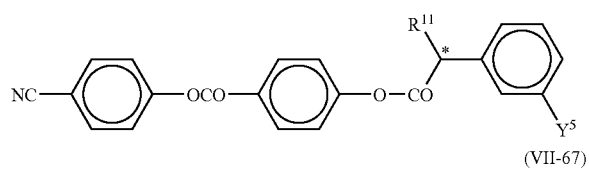
(VII-67)

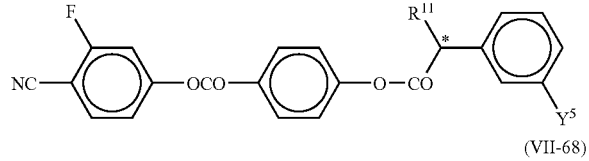
(VII-68)

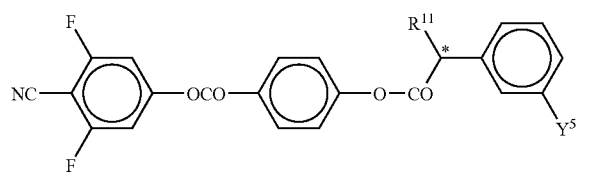

wherein * represents the position of an asymmetric carbon, $R^{11}$ represents a methyl group or a trifluoromethyl group, and $Y^5$ represents a methyl group, a methoxy group, a trifluoromethyl group or a trifluoromethoxy group.

In the case in which a compound having a large absolute value of positive dielectric constant anisotropy is required and is used in a composition suited for use in a display element which is driven using an active element, in the general formula (VI-h), $Y^4$ preferably represents a methyl group, a methoxy group, a trifluoromethyl group or a trifluoromethoxy group, $R^{10}$ preferably represents a methyl group or a trifluoromethyl group, Preferably, $A^{10}$ and $A^{11}$ each independently represents a structure selected from the group of partial structures represented by the general formula (VI-i), and more preferably at least one of which is selected from the group of structural formulas of the general formula (VI-j), $E^4$ preferably represents —$CH_2$—, —O—, —CO—, —COO—, —OCO—, —$CH_2CH_2$—, —$CH_2O$—, —$OCH_2$—, —$COCH_2$—, —$CH_2CO$—, —$COOCH_2$— or —$OCOCH_2$—, $Z^9$ preferably represents a single bond, $X^{16}$ preferably represents a fluorine atom, a chlorine atom or a trifluoromethoxy group, and s preferably represents 0.

Furthermore, preferred is a compound wherein $Y^4$ represents a methyl group, a methoxy group, a trifluoromethyl group or a trifluoromethoxy group, $R^{10}$ represents a methyl group or a trifluoromethyl group, at least one of $A^{10}$ and $A^{11}$ represents a structure selected from the group of structural formulas of the general formula (VI-j), $Z^9$ represents a single bond, $E^4$ represents —$CH_2$—, —O—, —CO—, —COO—, —OCO—, —$CH_2CH_2$—, —$CH_2O$—, —$OCH_2$—, —$COCH_2$—, —$CH_2CO$—, —$COOCH_2$— or —$OCOCH_2$—, $X^{16}$ represents a fluorine atom, a chlorine atom or a trifluoromethoxy group and s represets 0.

In the case in which a compound having a large absolute value of positive dielectric constant anisotropy and large refractive index anisotropy is required and is used in a composition suited for use in a display element which is driven using an active element, preferred is a compound wherein $Y^4$ represents a methyl group, a methoxy group, a trifluoromethyl group or a trifluoromethoxy group, $R^{10}$ represents a methyl group or a trifluoromethyl group, at least one of $A^{10}$ and $A^{11}$ represents a structure selected from the group of structural formulas of the general formula (VI-j), $Z^9$ represents —C≡C—, $E^4$ represents —$CH_2$—, —O—, —CO—, —COO—, —OCO—, —$CH_2CH_2$—, —$CH_2O$—, —$OCH_2$—, —$COCH_2$—, —$CH_2CO$—, —$COOCH_2$— or —$OCOCH_2$—, $X^{16}$ represents a fluorine atom, a chlorine atom or a trifluoromethoxy group and s represents 0.

Specific compounds are particularly preferably compounds represented by the following general formulas (VII-69) to (VII-86):

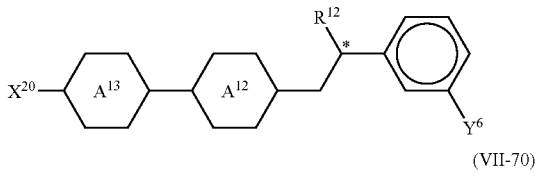
(VII-69)

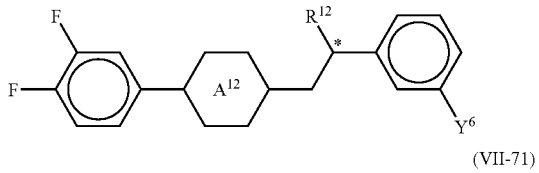
(VII-70)

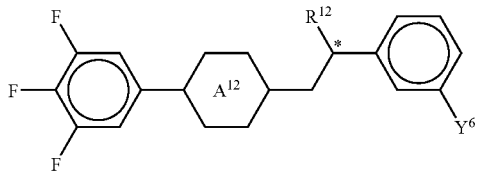
(VII-71)

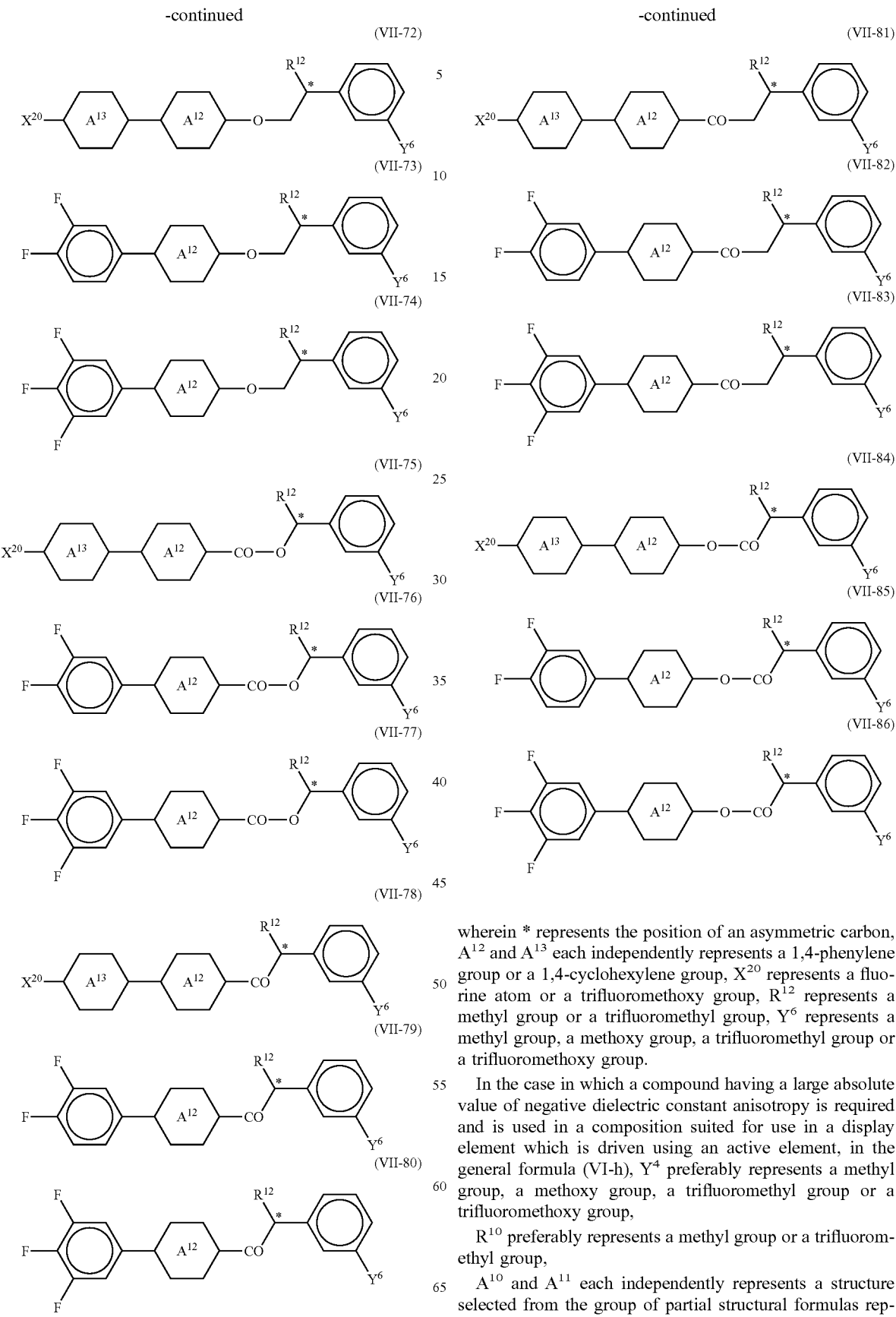

wherein * represents the position of an asymmetric carbon, $A^{12}$ and $A^{13}$ each independently represents a 1,4-phenylene group or a 1,4-cyclohexylene group, $X^{20}$ represents a fluorine atom or a trifluoromethoxy group, $R^{12}$ represents a methyl group or a trifluoromethyl group, $Y^6$ represents a methyl group, a methoxy group, a trifluoromethyl group or a trifluoromethoxy group.

In the case in which a compound having a large absolute value of negative dielectric constant anisotropy is required and is used in a composition suited for use in a display element which is driven using an active element, in the general formula (VI-h), $Y^4$ preferably represents a methyl group, a methoxy group, a trifluoromethyl group or a trifluoromethoxy group, $R^{10}$ preferably represents a methyl group or a trifluoromethyl group, $A^{10}$ and $A^{11}$ each independently represents a structure selected from the group of partial structural formulas represented by the general formula (VI-k):

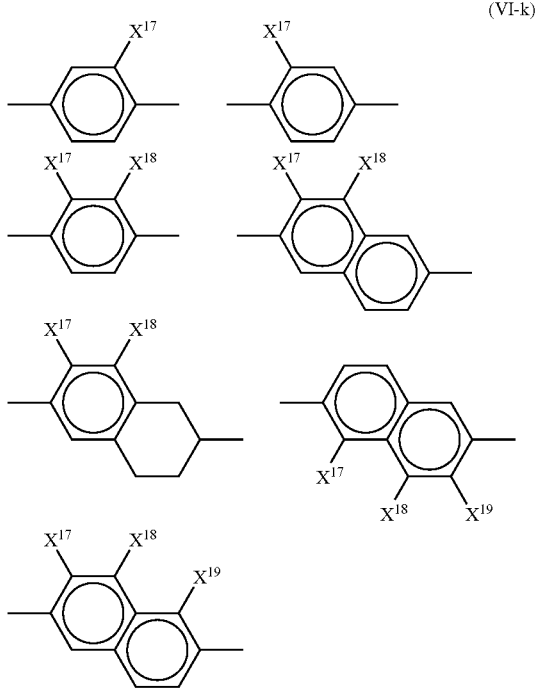

(VI-k)

wherein $X^{17}$ to $X^{19}$ each independently represents a hydrogen atom, a fluorine atom or a chlorine atom, and more preferably at least one of them is selected from the group of structural formulas of the general formula (VI-l):

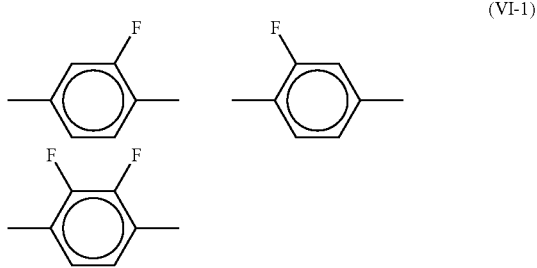

(VI-l)

$E^4$ preferably represents —CH$_2$—, —O—, —CO—, —COO—, —OCO—, —CH$_2$CH$_2$—, —CH$_2$O—, —OCH$_2$—, —COCH$_2$—, —CH$_2$CO—, —COOCH$_2$— or —OCOCH$_2$—, $Z^9$ preferably represents a single bond, $X^{16}$ preferably represents an alkyl group having 1 to 5 carbon atoms or an alkoxy group having 1 to 5 carbon atoms, and s represents 0.

Furthermore, more preferred is a compound wherein $Y^4$ represents a methyl group, a methoxy group, a trifluoromethyl group or a trifluoromethoxy group, $R^{10}$ represents a methyl group or a trifluoromethyl group, at least one of $A^{10}$ and $A^{11}$ represents a structure selected from the group of structural formulas of the general formula (VI-l), $E^4$ represents —CH$_2$—, —O—, —CO—, —COO—, —OCO—, —CH$_2$CH$_2$—, —CH$_2$O—, —OCH$_2$—, —COCH$_2$—, —CH$_2$CO—, —COOCH$_2$— or —OCOCH$_2$—, $Z^9$ represents a single bond, $X^{16}$ represents an alkyl group having 1 to 5 carbon atoms or an alkoxy group having 1 to 5 carbon atoms and s represents 0.

In the case in which a compound having a large absolute value of negative dielectric constant anisotropy and large refractive index anisotropy is required and is used in a composition suited for use in a display element which is driven using an active element, preferred is a compound wherein $Y^4$ represents a methyl group, a methoxy group, a trifluoromethyl group or a trifluoromethoxy group, $R^{10}$ represents a methyl group or a trifluoromethyl group, at least one of $A^{10}$ and $A^{11}$ represents a structure selected from the group of structural formulas of the general formula (VI-l), $E^4$ represents —CH$_2$—, —O—, —CO—, —COO—, —OCO—, —CH$_2$CH$_2$—, —CH$_2$O—, —OCH$_2$—, —COCH$_2$—, —CH$_2$CO—, —COOCH$_2$— or —OCOCH$_2$—, $Z^9$ represents —C≡C—, $X^{16}$ represents an alkyl group having 1 to 5 carbon atoms or an alkoxy group having 1 to 5 carbon atoms and s represents 0.

Specific compounds are particularly preferably compounds represented by the following general formulas (VII-87) to (VII-98):

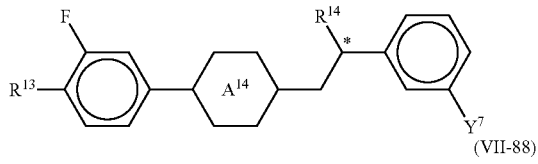

(VII-87)

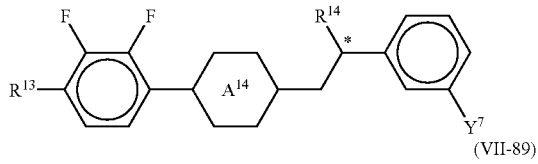

(VII-88)

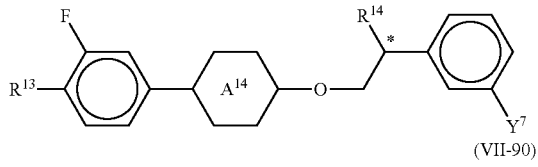

(VII-89)

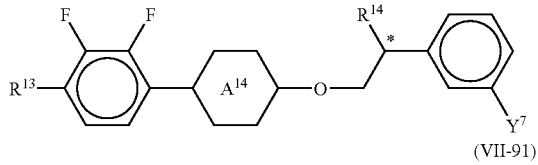

(VII-90)

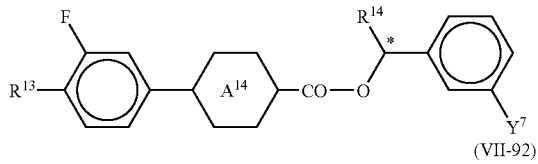

(VII-91)

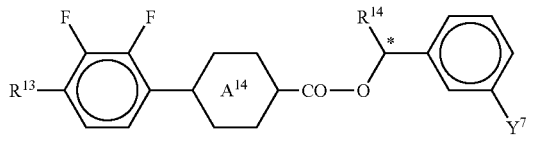

(VII-92)

-continued

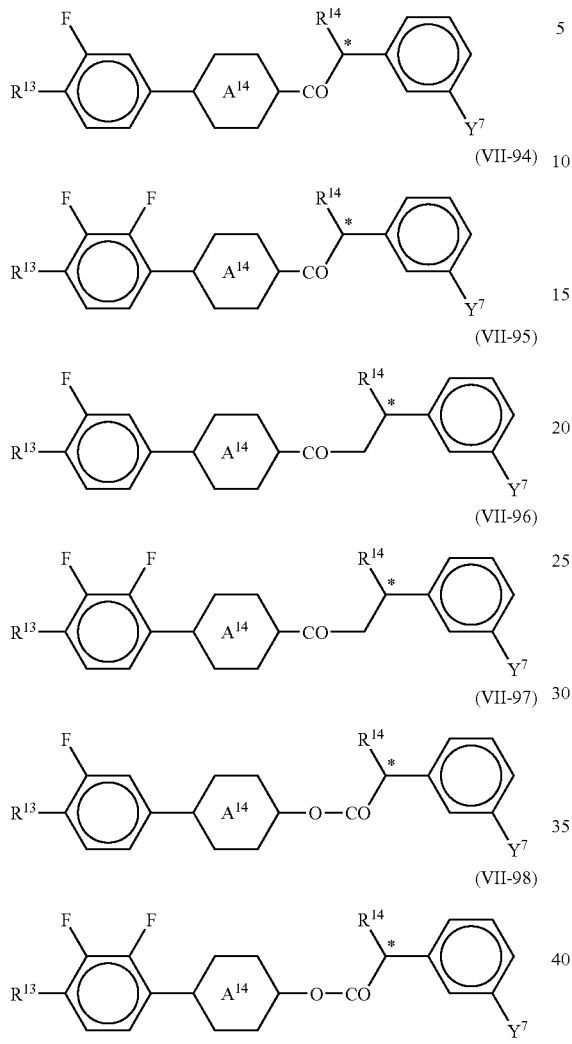

wherein * represents the position of an asymmetric carbon, $A^{14}$ represents a 1,4-phenylene group or a 1,4-cyclohexylene group, $R^{13}$ represents an alkyl group having 1 to 3 carbon atoms or an alkoxy group having 1 to 3 carbon atoms, $R^{14}$ represents a methyl group or a trifluoromethyl group, and $Y^7$ represents a methyl group, a methoxy group, a trifluoromethyl group or a trifluoromethoxy group.

In the case in which a compound having a particularly large HTP value is required, preferred is a compound represented by the general formula (VI-m):

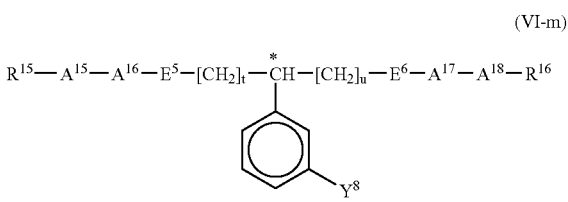

wherein * represents the position of an asymmetric carbon, $R^{15}$ and $R^{16}$ each independently represents an alkyl group having 1 to 7 carbon atoms, an alkoxy group having 1 to 7 carbon atoms, an alkenyl group having 2 to 7 carbon atoms or an alkenyloxy group having 2 to 7-carbon atoms, $Y^9$ represents a methyl group, a methoxy group, a trifluoromethyl group or a trifluoromethoxy group, $Y^8$ represents an alkyl group having 1 to 3 carbon atoms, an alkoxy group having 1 to 3 carbon atoms, an alkenyl group having 2 to 3 carbon atoms, an alkenyloxy group having 2 to 3 carbon atoms (the alkyl group, the alkenyl group, the alkoxy group and the alkenyloxy group are not substituted or can have one, or two or more fluorine atoms or chlorine atoms as a substituent), a fluorine atom, a chlorine atom or a bromine atom, $A^{15}$, $A^{16}$, $A^{17}$ and $A^{18}$ each independently represents a 1,4-phenylene group, a 1,4-cyclohexylene group, decahydronaphthalene-2,6-diyl group, a pyrimidine-2,5-diyl group, a 1,2,3,4-tetrahydronaphthalene-2,6-diyl group or a 2,6-naphthylene group, and the 1,4-phenylene group, the 1,2,3,4-tetrahydronaphthalene-2,6-diyl group and the 2,6-naphthylene group are not substituted or can have one, or two or more fluorine atoms, chlorine atoms, trifluoromethyl groups, trifluoromethoxy groups or methyl groups as a substituent, $E^5$ and $E^6$ each independently represents a single bond, —O—, —CO—, —COO—, —OCO—, —CH$_2$—, —CH$_2$CH$_2$—, —CH$_2$O—, —OCH$_2$—, —COCH$_2$—, —CH$_2$CO—, —COOCH$_2$—, —OCOCH$_2$—, —CH$_2$COO— or —CH$_2$OCO—, and t and u each independently represents 0, 1 or 2.

A compound of the general formula (VI-m) wherein $R^{15}$ and $R^{16}$, $A^{15}$ and $A^{18}$, $A^{16}$ and $A^{17}$, and $E^5$ and $E^6$ are respectively the same and t+u=1 is preferable because it is easily produced and specific compound is particularly preferably a compound represented by the following general formula (VII-99) or (VII-100):

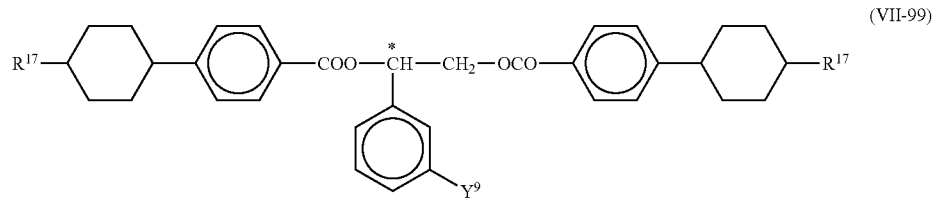

-continued

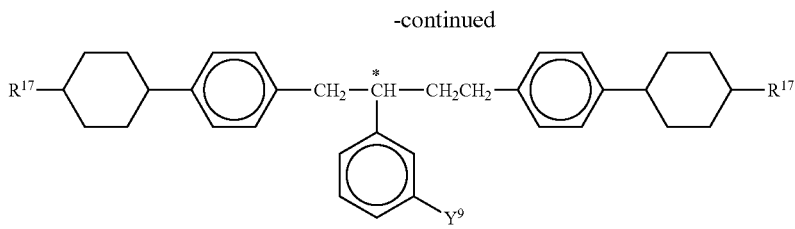

(VII-100)

wherein * represents the position of an asymmetric carbon, $R^{17}$ represents an alkyl group having 1 to 7 carbon atoms, an alkoxy group having 1 to 7 carbon atoms, an alkenyl group having 2 to 7 carbon atoms or an alkenyloxy group having 2 to 7 carbon atoms, and $Y^9$ represents a methyl group, a methoxy group, a trifluoromethyl group or a trifluoromethoxy group.

In general, the HTP value of the optically active compound has temperature dependency and conventional chiral agents such as S-811, CB-15 and CN often have positive temperature dependency, that is, they have a tendency such that the HTP value decreases as the temperature increases.

The threshold voltage (Vth) of a twist nematic type device (TN type device) is given by the equation (1) (F. J. Kahn and R. A. Burmeister Jr. 239. Nonemissive Electrooptic Displays):

$$Vth = \sqrt{\frac{\pi \times K}{\Delta \varepsilon}}$$ Equation (1)

$$K = K_{11} + \frac{1}{4}(K_{33} - 2K_{22}) + 2K_{22}\left(\frac{L}{P}\right)$$

where $K_{11}$, $K_{22}$ and $K_{33}$ each represents a Frank's elastic modulus, $\Delta\varepsilon$ represents a dielectric constant anisotropy, L represents a thickness of a liquid crystal layer, and P represents a natural pitch.

Vth of a super twist nematic type device (STN type device) is given by the equation (2) (written by Shoichi MATSUMOTO and Ichiro SUMIDA, Foundation and Application of Liquid Crystals):

$$Vth = \sqrt{\frac{[4\pi(d/p)K_{22} - \{K_{33} - 2(K_{33} - K_{22})\cos^2\theta\}\phi]\theta}{\Delta\varepsilon}}$$ Equation (2)

where $K_{11}$, $K_{22}$ and $K_{33}$ each represents a Frank's elastic modulus, $\Delta\varepsilon$ represents a dielectric constant anisotropy, L represents a thickness of a liquid crystal layer, P represents a natural pitch, $\phi$ represents a twist angle of a molecular arrangement of a liquid crystal, and $\theta$ represents a pre-tilt angle.

Since there is a tendency for the elastic modulus (K) to decrease as the temperature increases, the threshold voltage decreases in any of TN type and STN type devices according to these equations. The liquid crystal composition containing the above-mentioned general optically active compound whose HTP value decreases as the temperature increases has a large problem in that the threshold voltage drastically decreases as the temperature increases according to the equations (1) and (2) because the natural pitch P decreases.

In the liquid crystal composition containing the above-mentioned general optically active compound whose HTP value decreases as the temperature increases, decrease of the threshold voltage due to the temperature increase is suppressed.

Since a compound of the general formula (I) wherein any of p, q and m represents 0, $E^2$ represents a single bond, $R^2$ represents a methyl group and $E^1$ represents —COO— has the effect of suppressing the increase in threshold voltage with the temperature increase because the HTP value increases as the temperature increases. More preferred is a compound wherein $Y^1$ preferably represents an alkyl group having 1 to 3 carbon atoms, an alkoxyl group having 1 to 3 carbon atoms, a fluorine atom, a chlorine atom, a bromine atom or a cyano group, $R^1$ preferably represents a cyano group, a fluorine atom, a chlorine atom, a difluoromethoxy group, a trifluoromethoxy group, a fluorine atom, chlorine atom or a bromine atom, $Y^1$ preferably represents an alkyl group having 1 to 3 carbon atoms, an alkoxyl group having 1 to 3 carbon atoms, a fluorine atom, a chlorine atom, a bromine atom or a cyano group, $R^1$ preferably represents a cyano group, a fluorine atom, a chlorine atom, a difluoromethoxy group, a trifluoromethoxy group, a fluorine atom, a chlorine atom or a bromine atom, $A^1$ and $A^2$ each independently represents a 1,4-phenylene group, a 2-fluoro-1,4-phenylene group, a 3-fluoro-1,4-phenylene group, a 2,6-difluoro-1,4-phenylene group or a 3,5-difluoro-1,4-phenylene group and $Z^2$ represents a single bond or —C≡C—.

The above-mentioned compounds can be produced, for example, by the following methods.

Production Method 1: Production of Compounds of the General Formulas (VIII-c) and (VIII-d)

(The case in which $A^2$ represents a 1,4-phenylene group, $E^2$ represents a single bond, $E^1$ represents CO or $CH_2$, and m and q represent 0 in the general formula (I))

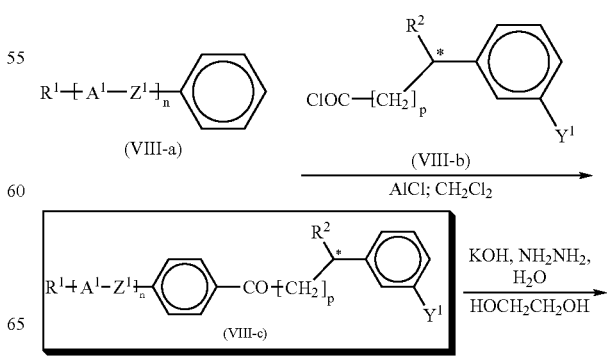

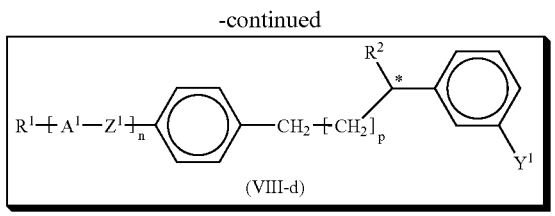

(VIII-d)

wherein *, $R^1$, $R^2$, $Z^1$, $Y^1$, $A^1$, p and n represent the same meanings as in the general formula (I)

A compound represented by the general formula (VIII-c) can be produced by reacting a compound represented by the general formula (VIII-a) with a carboxylic acid chloride derivative represented by the general formula (VIII-b). A compound represented by the general formula (VIII-d) can be produced by reducing a carbonyl group in the general formula (VIII-c).

Production Method 2: Production of Compound of the General Formula (VIII-d2)

(The case in which $A^2$ represents a 1,4-phenylene group, $E^2$ represents a single bond, $E^1$ represents CO or $CH_2$, and m+q represents 1, 2, 3 or 4 in the general formula (I))

A compound represented by the general formula (VIII-d2):

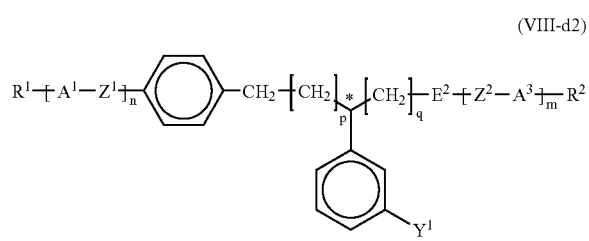

(VIII-d2)

wherein *, $R^1$, $R^2$, $E^2$, $Z^1$, $Z^2$, $Y^1$, $A^1$, $A^3$, p, q, m and n represent the same meanings as in the general formula (I) can be produced by using a compound represented by the general formula (VIII-e):

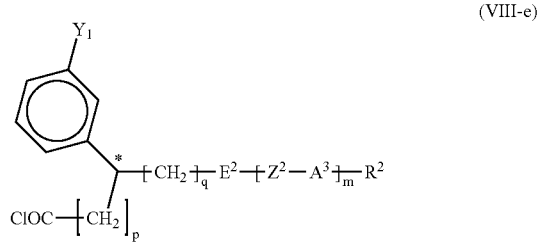

(VIII-e)

wherein *, $R^2$, $E^2$, $Z^2$, $Y^1$, $A^3$, p, q and m represent the same meanings as in the general formula (I) in place of the compound represented by the general formula (VIII-b) in the reaction scheme described in the production method 1.

Production Method 3: Production of Compound of the General Formula (VIII-h)

(The case in which $A^2$ represents a 1,4-phenylene group, $E^2$ represents a single bond, m and q represent 0, and $E^1$ represents an oxygen atom in the general formula (I))

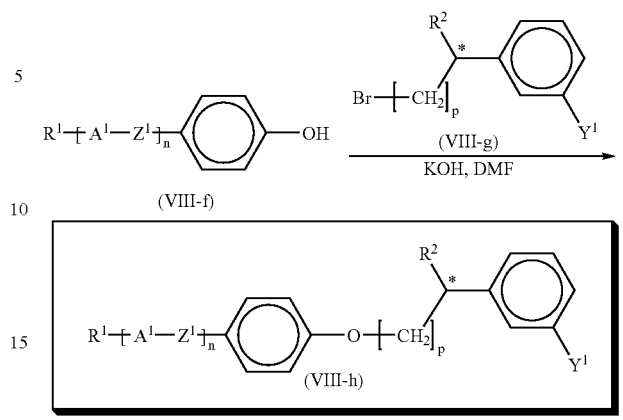

wherein *, $R^1$, $R^2$, $Z^1$, $Y^1$, $A^1$, p and n represent the same meanings as in the general formula (I)

A compound represented by the general formula (VIII-h) can be produced by etherifying a phenol derivative represented by the general formula (VIII-f) and a compound represented by the general formula (VIII-g) according to a conventional method.

Production Method 4: Production of Compound of the General Formula (VIII-h2)

(The case in which $A^2$ represents a 1,4-phenylene group, $E^2$ represents a single bond, m+q represent 1, 2, 3 or 4, and $E^1$ represents an oxygen atom)

A compound represented by the general formula (VIII-h2):

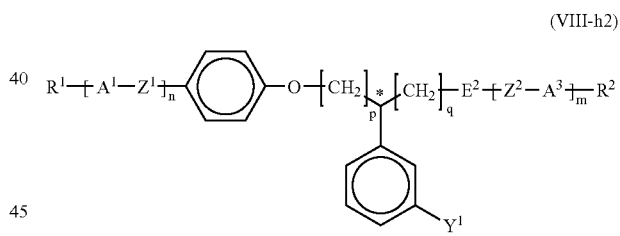

(VIII-h2)

wherein *, $R^1$, $R^2$, $E^2$, $Z^1$, $Z^2$, $Y^1$, $A^1$, $A^3$, p, q, m and n represent the same meanings as in the general formula (I) can be produced by using a compound represented by the general formula (VIII-i):

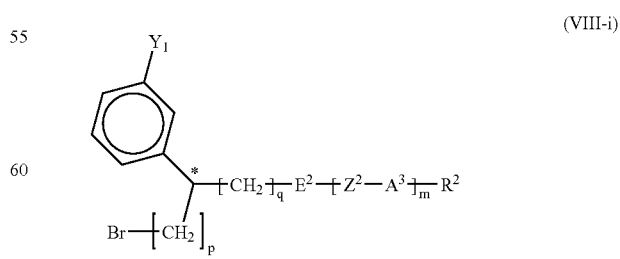

(VIII-i)

wherein *, $R^2$, $E^2$, $Z^2$, $Y^1$, $A^3$, p, q and m represent the same meanings as in the general formula (I) in place of the compound represented by the general formula (VIII-g) in the reaction scheme described in the production method 3.

Production Method 5: Production of Compound of the General Formula (VIII-p)

(The case in which $E^1$ represents —COO—, $E^2$ represents —OCO—, and $A^2$ represents a 1,4-phenylene group in the general formula (I))

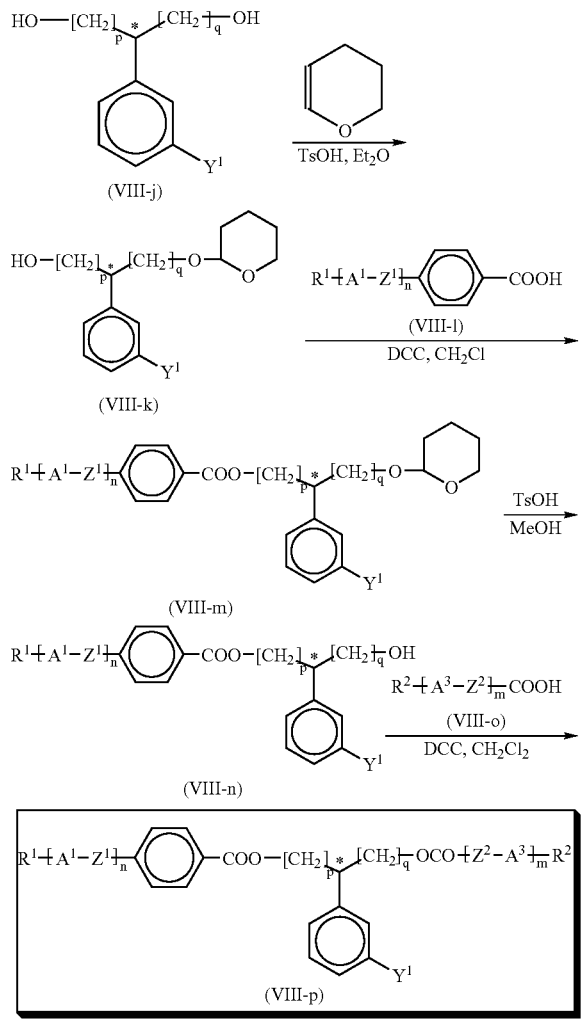

wherein *, $R^1$, $R^2$, $E^1$, $E^2$, $Z^1$, $Z^2$, $Y^1$, $A^1$, $A^3$, p, q, m and n represent the same meanings as in the general formula (I)

An ester derivative represented by the general formula (VIII-m) is produced by protecting one hydroxyl group of a diol derivative represented by the general formula (VIII-j) and reacting with a benzoic acid derivative represented by the general formula (VIII-l). A compound represented by the general formula (VIII-p) can be produced by deprotecting a protective group of the general formula (VIII-m) and reacting with a carboxylic acid derivative represented by the general formula (VIII-o).

Production Method 6: Production of Compound of the General Formula (VIII-t)

(The case in which $A^2$ represents a 1,4-phenylene group, m and q represent 0, and $E^1$ and $E^2$ represent a single bond in the general formula (I))

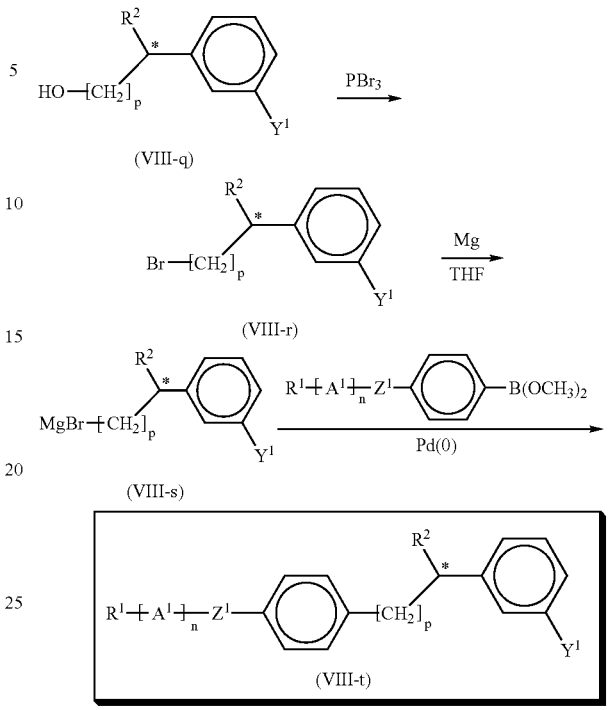

wherein *, $R^1$, $R^2$, $Z^1$, $Z^2$, $Y^1$, $A^1$, $A^3$, p and n have the same meanings as in the general formula (I)

A Grignard reagent represented by the general formula (VIII-s) is produced by brominating a hydroxyl group of an alcohol derivative represented by the general formula (VIII-q) and reacting with magnesium. A compound represented by the general formula (VIII-t) can be produced by reacting the resulting Grignard reagent with a boric acid derivative in the presence of a transition metal catalyst such as palladium.

Production Method 7: Production of Compound of the General Formula (VIII-w)

(The case in which $A^2$ represents a 1,4-cyclohexylene group, m and q represent 0, and $E^1$ and $E^2$ represent a single bond in the general formula (I))

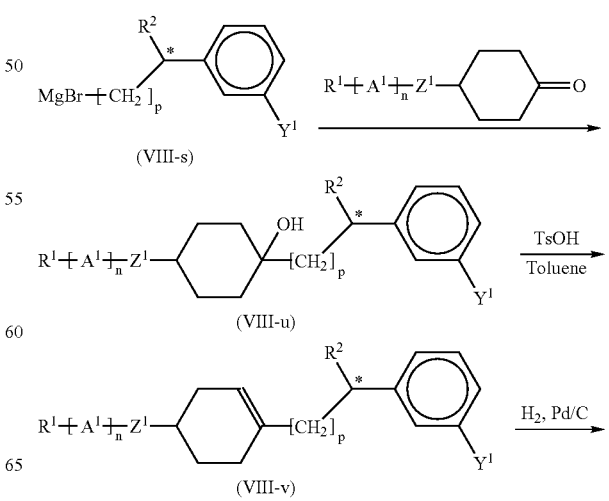

-continued

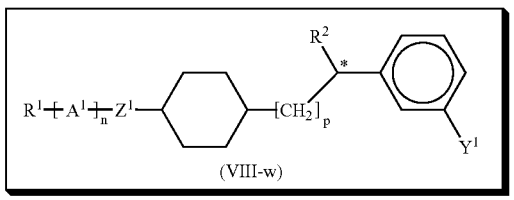

(VIII-w)

wherein *, $R^1$, $R^2$, $Z^1$, $Y^1$, $A^1$, p and n represent the same meanings as in the general formula (I)

A compound represented by the general formula (VIII-u) is produced by reacting the Grignard reagent represented by the general formula (VIII-s) produced by the production method 6 with a cyclohexanone derivative. A compound represented by the general formula (VIII-w) can be produced by eliminating a hydroxyl group through the dehydration reaction to give a cyclohexene derivative represented by the general formula (VIII-v) and hydrogenating the cyclohexene derivative in the presence of a metal catalyst.

Production Method 8: Production of Compound of the General Formula (VIII-w)

(The case in which $A^2$ represents a 1,4-phenylene group, $E^2$ represents a single bond, m and q represent 0, and $E^1$ represents —COO— in the general formula (I))

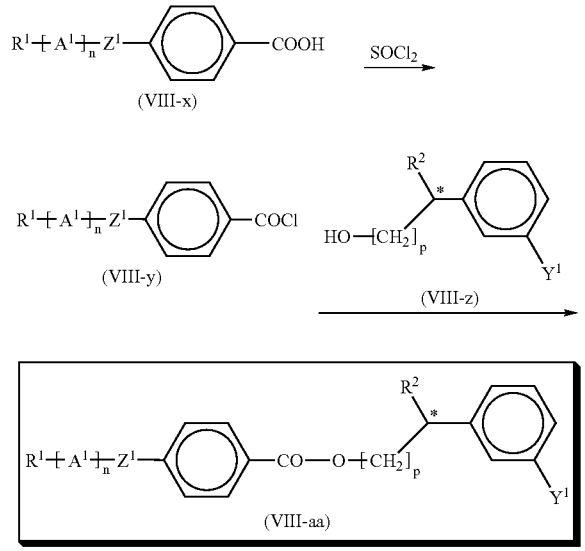

wherein *, $R^1$, $R^2$, $A^1$, $Z^1$, $Y^1$, p and n represent the same meanings as in the general formula (I)

An acid chloride derivative represented by the general formula (VIII-y) is produced by reacting a compound represented by the general formula (VIII-x) with a halogenating agent such as thionyl chloride. A compound represented by the general formula (VIII-aa) can be produced by reacting the resulting the resulting derivative represented by the general formula (VIII-y) with an alcohol derivative represented by the general formula (VIII-z).

The optically active alcohol derivative represented by the general formula (VIII-z) used in the reaction can be produced by the following method.

In the case in which p represents 0, the optically active alcohol derivative can be obtained by the asymmetric reduction of the corresponding benzophenone derivative using a baker's yeast.

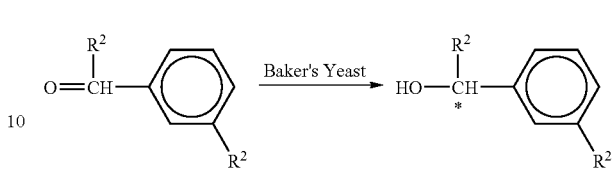

wherein *, $R^2$ and $Y^1$ represent the same meanings as in the general formula (I)

In the case in which p represents numeral other than 0, an optically active ester is obtained by producing a racemic alcohol derivative, preferentially esterifying one enantiomer through the enzyme reaction as described above and subjecting the product to column chromatography and recrystallization. An optically active alcohol derivative represented by the general formula (VIII-z) can be produced by hydrolyzing the resulting ester.

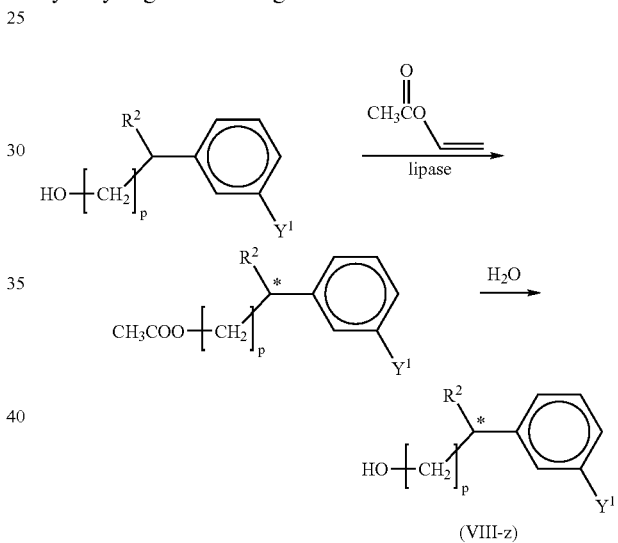

wherein *, p, $R^2$ and $Y^1$ represent the same meanings as in the general formula (I)

The optically active alcohol derivative represented by the general formula (VIII-z) can also be produced by producing a racemic alcohol derivative, converting an enantiomer into a diastereomer using an optically active carboxylic acid derivative and isolating both using a general separation method, followed by hydrolysis.

The optically active alcohol derivative represented by the general formula (VIII-z) can also be produced by producing a corresponding racemic ester derivative and preferentially hydrolyzing one enantiomer through the enzyme reaction.

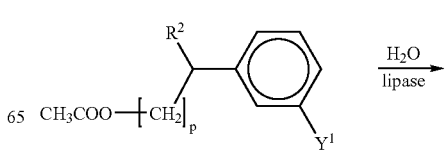

-continued

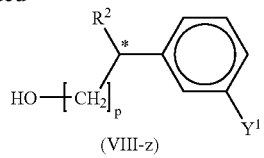

(VIII-z)

wherein *, p, $R^2$ and $Y^1$ represent the same meanings as in the general formula (I)

This reaction is particularly useful in the case in which p represents 0.

Regarding the optically active compound represented by the general formula (I) of the present invention, compounds other than those described above can be produced by combinations of the above techniques and combinations with existing techniques.

The compounds of the present invention can be purified by optionally subjecting the reaction product to purification treatments such as column chromatography, distillation and recrystallization.

The liquid crystal composition of the present invention will be described below.

The liquid crystal composition of the present invention is characterized by containing one or more optically active compounds of the present invention. The content of the optically active compound is preferably within a range from 0.01% by weight to 50% by weight, more preferably from 0.1% by weight to 30% by weight, and is adjusted according to the required value of the natural pitch.

The natural pitch at 25° C. of the liquid crystal composition of the present invention is preferably within a range from 0.1 to 1000 µm and the optimum value thereof varies with purpose. When using as a liquid crystal composition for TN type liquid crystal device, the natural pitch is preferably within a range from 20 to 1000 µm, and more preferably from 30 to 200 µm. When using as a liquid crystal composition for STN type liquid crystal device, the natural pitch is preferably within a range from 2 to 50 µm, and more preferably from 4 to 20 µm. When using as a cholesteric liquid crystal composition, the natural pitch is preferably within a range from 0.1 to 2 µm, and more preferably from 0.15 to 1 µm.

To adjust the temperature dependency of the HTP value, other optically active compounds are preferably added, in addition to the optically active compound of the present invention, and one to five kinds of other optically active compounds are preferably contained. Such an optically active compound is a cholesterol derivative or an optically active compounds represented by the general formula (IX-a):

(IX-a)

wherein R' and R" each independently represents an alkyl group having 1 to 10 carbon atoms, an alkenyl group having 2 to 10 carbon atoms, a hydrogen atom, a fluorine atom, a chlorine atom, a bromine atom, an iodine atom, a cyano group or an isothiocyanate group, the alkyl group or the alkenyl group is not substituted or can have one, two or more fluorine atoms, chlorine atoms, cyano groups, methyl groups or trifluoromethyl groups as a substituent, and one, or two or more methylene groups existing in the alkyl group or the alkenyl group may be substituted with —CO— or may be substituted with an oxygen atom or —COO— in such a manner that oxygen atoms are not directly bonded to each other, $P^1$, $P^2$ and $P^3$ each independently represents a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a 1,2,3,4-tetrahydronaphthalene-2,6-diyl group, a 2,6-naphthylene group, an indane-2,5-diyl group, a phenanthrene-2,7-diyl group, a 9,10-dihydrophenanthrene-2,7-diyl group, a 1,2,3,4,4a,9,10a-octahydrophenanthrene-2,7-diyl group or a fluorene-2,7-diyl group, and the 1,4-phenylene group, the 1,2,3,4-tetrahydronaphthalene-2,6-diyl group, the 2,6-naphthylene group, the phenanthrene-2,7-diyl group, the 9,10-dihydrophenanthrene-2,7-diyl group, the 1,2,3,4,4a,9,10a-octahydrophenanthrene-2,7-diyl group and the fluorene-2,7-diyl group are not substituted or can have one, or two or more fluorine atoms, chlorine atoms, trifluoromethyl groups, trifluoromethoxy groups or methyl groups as a substituent, $L^1$ and $L^2$ represent a single bond, —COO—, —OCO—, —C≡C— or an alkylene group having 2 to 5 carbon atoms in which one, or two or more methylene groups existing in the group may be substituted with —CO— or may be substituted with an oxygen atom or —COO— in such a manner that oxygen atoms are not directly bonded to each other, and the alkylene group is not substituted or may have one, or two or more fluorine atoms, alkyl groups having 1 to 5 carbon atoms, trifluoromethyl groups, trifluoromethoxy groups or phenyl groups as a substituent, w is 0, 1 or 2, and when w is 2, the two groups $p^1$ or the two groups $L^1$ may be the same or different, and at least one of R', R", $L^1$ and $L^2$ is an optically active group.

Specifically, it is preferable to use in combination with optically active compounds represented by the following general formulas (X-a) to (X-l):

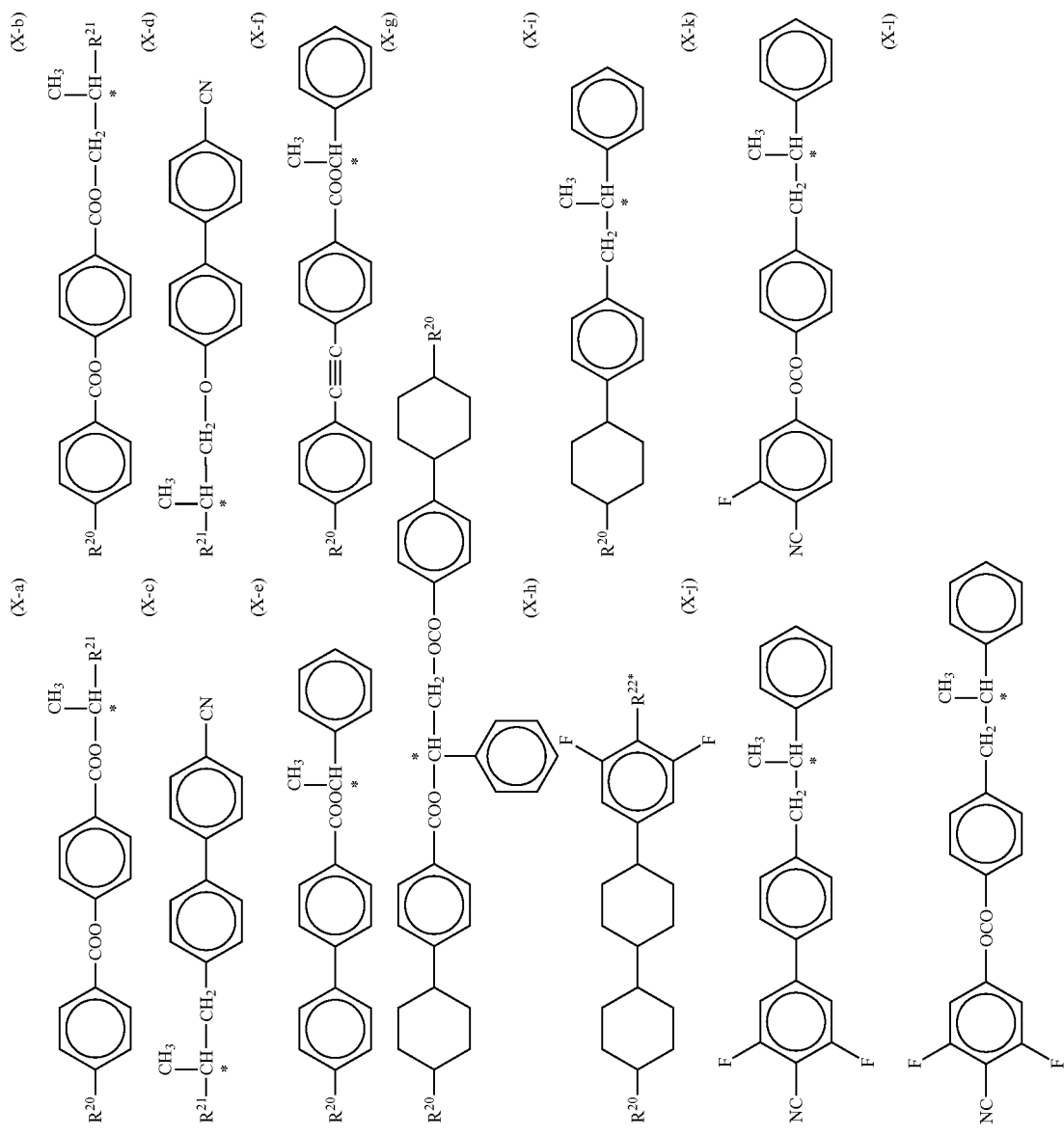

wherein * represents the position of an asymmetric carbon, $R^{20}$ represents an alkyl group having 1 to 10 carbon atoms, an alkoxy group having 1 to 10 carbon atoms, an alkenyl group having 2 to 10 carbon atoms or an alkenyloxy group having 2 to 10 carbon atoms, $R^{21}$ represents an alkyl group having 1 to 10 carbon atoms, $R^{22}$* represents an alkyl group having 1 to 10 carbon atoms having one, or two or more asymmetric carbon atoms or an alkoxy group having 1 to 10 carbon atoms.

The liquid crystal composition of the present invention preferably contains one, or two or more kinds of compounds selected from the group of compounds represented by the general formulas (II-a), (II-b) and (II-c):

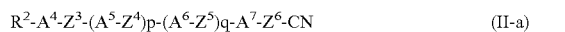
$$R^2\text{-}A^4\text{-}Z^3\text{-}(A^5\text{-}Z^4)p\text{-}(A^6\text{-}Z^5)q\text{-}A^7\text{-}Z^6\text{-}CN \quad \text{(II-a)}$$

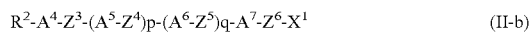
$$R^2\text{-}A^4\text{-}Z^3\text{-}(A^5\text{-}Z^4)p\text{-}(A^6\text{-}Z^5)q\text{-}A^7\text{-}Z^6\text{-}X^1 \quad \text{(II-b)}$$

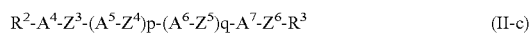
$$R^2\text{-}A^4\text{-}Z^3\text{-}(A^5\text{-}Z^4)p\text{-}(A^6\text{-}Z^5)q\text{-}A^7\text{-}Z^6\text{-}R^3 \quad \text{(II-c)}$$

wherein $R^2$ and $R^3$ each independently represents an alkyl group having 1 to 10 carbon atoms or an alkenyl group having 2 to 10 carbon atoms, the alkyl group or the alkenyl group is not substituted or can have one, or two or more fluorine atoms, chlorine atoms, cyano groups, methyl groups or trifluoromethyl groups as a substituent, and one, or two or more methylene groups existing in the alkyl group or the alkenyl group may be substituted with —CO— or may be substituted with an oxygen atom or —COO— in such a manner that oxygen atoms are not directly bonded to each other, $A^4$, $A^5$, $A^6$ and $A^7$ each independently represents a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a 1,2,3,4-tetrahydronaphthalene-2,6-diyl group, a 2,6-naphthylene group, an indane-2,5-diyl group, a phenanthrene-2,7-diyl group, a 9,10-dihydrophenanthrene-2,7-diyl group, a 1,2,3,4,4a,9,10a-octahydrophenanthrene-2,7-diyl group or a fluorene-2,7-diyl group, and the 1,4-phenylene group, the 1,2,3,4-tetrahydronaphthalene-2,6-diyl group, the 2,6-naphthylene group, the phenanthrene-2,7-diyl group, the 9,10-dihydrophenanthrene-2,7-diyl group, the 1,2,3,4,4a,9,10a-octahydrophenanthrene-2,7-diyl group and the fluorene-2,7-diyl group are not substituted or can have one, or two or more fluorine atoms, chlorine atoms, trifluoromethyl groups, trifluoromethoxy groups or methyl groups as a substituent, $Z^3$, $Z^4$, $Z^5$ and $Z^6$ each independently represents a single bond, —CO—, —COO—, —OCO—, —CH=N—, —N=CH—, —C≡C—, —CH$_2$CH$_2$—, —CH$_2$CH$_2$CH$_2$—, —CH$_2$CH$_2$CH$_2$CH$_2$—, —CH$_2$O—, —OCH$_2$—, —CF$_2$O—, —OCF$_2$—, —CH=N—N=CH—, —CF=CF—, —CH=CH—, —CH$_2$CH$_2$CH=CH—, —CH=CHCH$_2$CH$_2$— or —CH$_2$CH=CHCH$_2$—, $X^1$ represents a fluorine atom, a chlorine atom, a trifluoromethyl group, a trifluoromethoxy group, a difluoromethoxy group or an isothiocyanate group, and p and q each independently represents 0 or 1.

When using the liquid crystal composition of the present invention as a liquid crystal composition for STN and TN type liquid crystal devices, or a cholesteric liquid crystal composition, the liquid crystal composition preferably contains one or more kinds, and more preferably two or more kinds of liquid crystal compounds represented by the general formula (II-a) as the component of the liquid crystal composition in order to increase the dielectric constant anisotropy. Specific examples of the general formula (II-a) are preferably compounds represented by the general formulas (III-a) to (III-j):

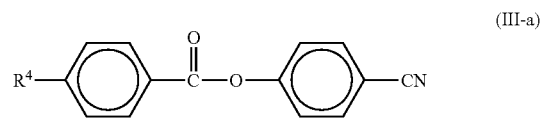
(III-a)

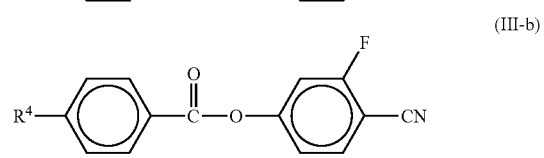
(III-b)

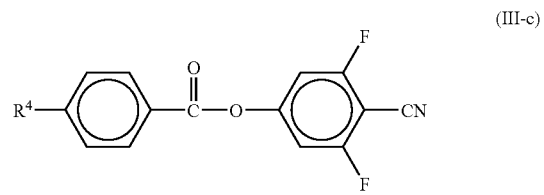
(III-c)

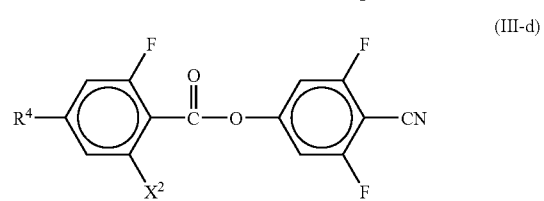
(III-d)

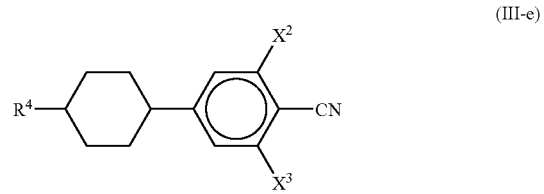
(III-e)

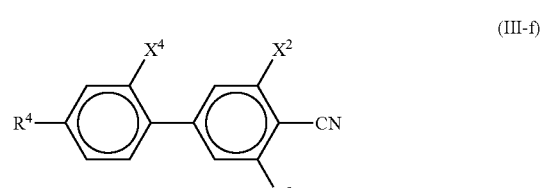
(III-f)

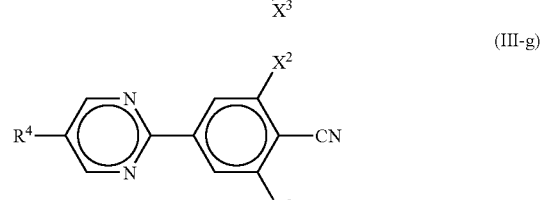
(III-g)

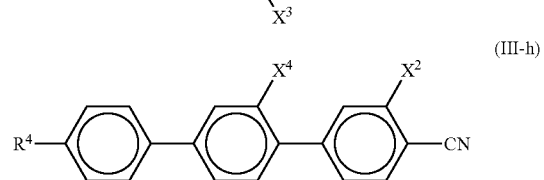
(III-h)

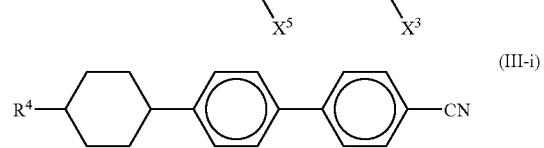
(III-i)

-continued (III-j)
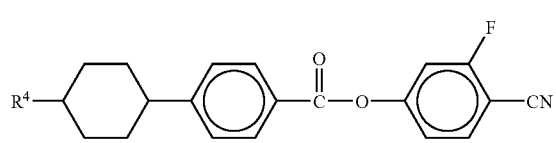

wherein R⁴ represents an alkyl group having 1 to 10 carbon atoms, alkoxyl group having 1 to 10 carbon atoms, an alkenyl group having 2 to 10 carbon atoms or an alkenyloxy group having 2 to 10 carbon atoms, and $X^2$ to $X^5$ each independently represents a hydrogen atom, a fluorine atom or a chlorine atom, more preferably a compound selected from the group of compounds represented by the general formulas (III-b), (III-c), (III-d), (III-e) and (III-f), and particularly preferably two or more kinds of these compounds.

To adjust physical properties such as refractive index anisotropy and viscosity, the liquid crystal composition can contain a compound represented by the formula (II-c). Specifically, the compound is preferably selected from the group of compounds represented by the general formulas (V-a) to (V-n):

(V-a)
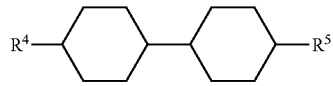

(V-b)
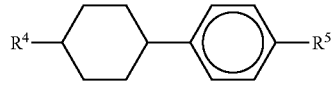

(V-c)

(V-d)

(V-e)
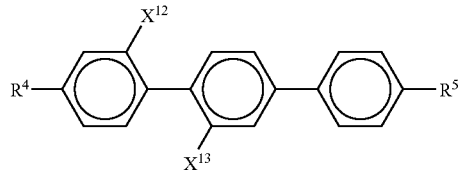

(V-f)
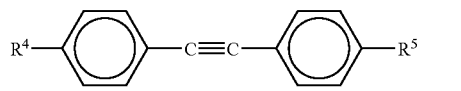

(V-g)
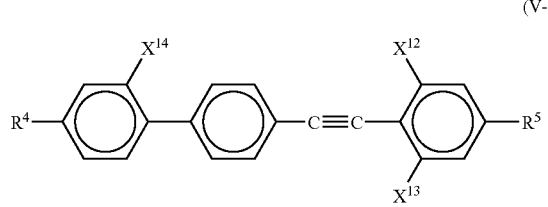

(V-h)
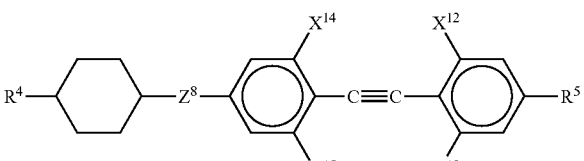

(V-i)
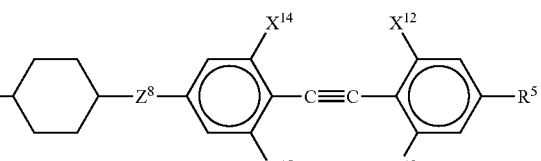

(V-j)
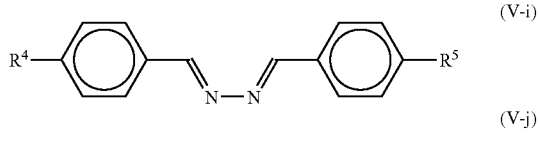

(V-k)
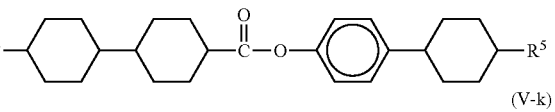

(V-l)
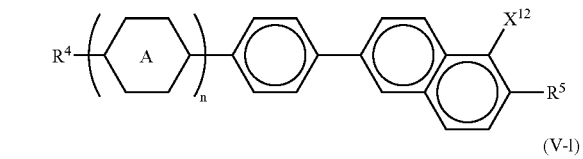

(V-m)
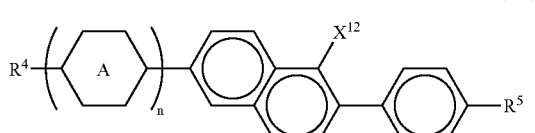

(V-n)
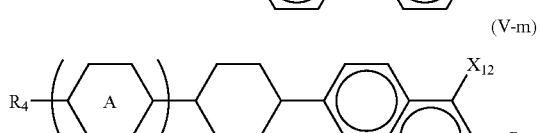

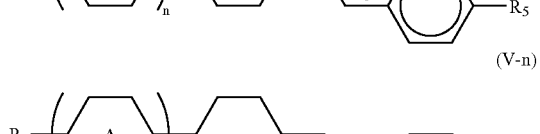

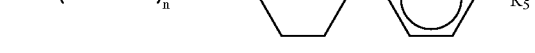

wherein R⁴ and R⁵ each independently represents an alkyl group having 1 to 10 carbon atoms, an alkoxyl group having 1 to 10 carbon atoms, an alkenyl group having 2 to 10 carbon atoms or an alkenyloxy group having 2 to 10 carbon atoms, A represents a 1,4-phenylene group or a 1,4-cyclohexylene group, $Z^8$ represents a single bond, —CH₂—CH₂— or —COO—, and $X^{12}$ to $X^{15}$ each independently represents a hydrogen atom, a fluorine atom or a methyl group. To increase the refractive index anisotropy, the liquid crystal composition preferably contains a compound selected from the group of compounds represented by the general formulas (V-e), (V-f), (V-g), (V-h), (V-i), (V-k) and (V-i). To decrease the viscosity, the liquid crystal composition preferably contains a compound selected from the group of compounds represented by the general formulas (V-a), (V-b), (V-c), (V-d) and (V-e). To broaden the temperature range of the liquid crystal, the liquid crystal composition preferably contains a compound selected from the group of compounds represented by the general formulas (V-j), (V-k), (V-l), (V-m) and (V-n).

When using the liquid crystal composition of the present invention as a liquid crystal composition for active driving type liquid crystal device, the liquid crystal composition preferably contains one or more kinds, and more preferably two or more kinds of liquid crystal compounds represented by the general formula (II-b) as the component of the liquid crystal composition in order to increase the dielectric constant anisotropy. Specific examples of the general formula (II-b) are preferably compounds represented by the general formulas (IV-a) to (IV-k):

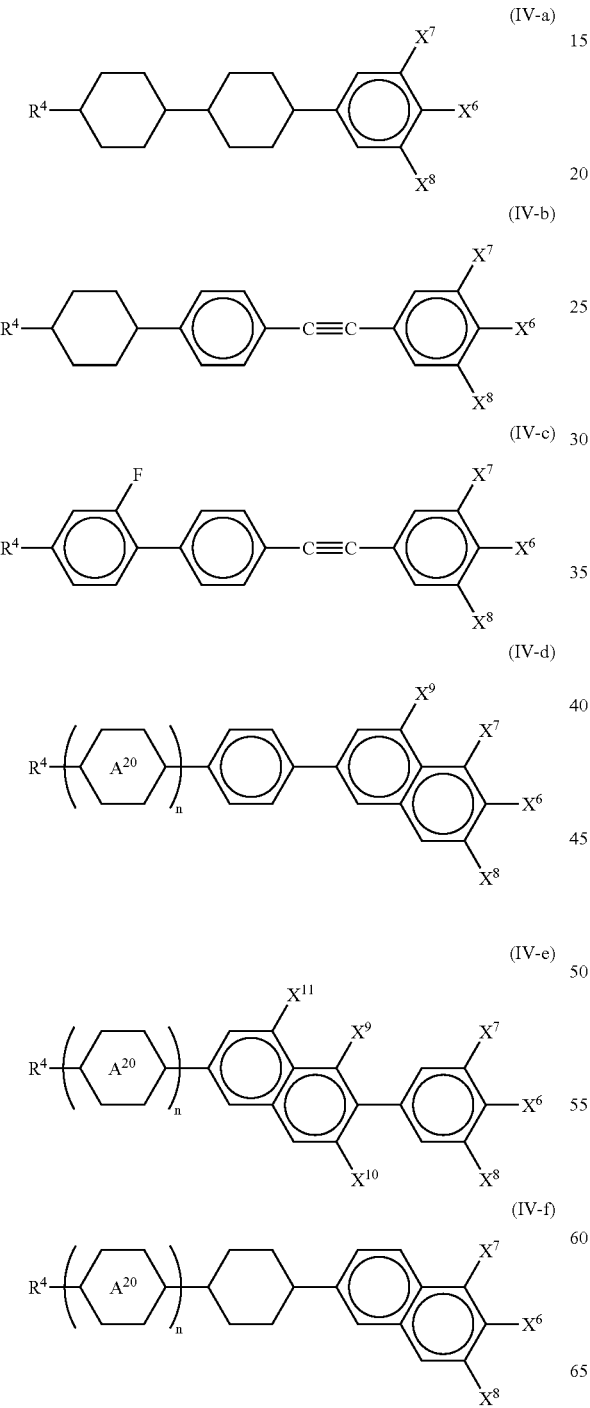

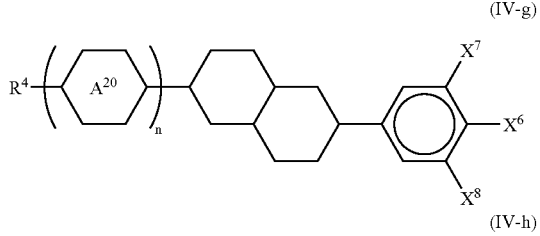

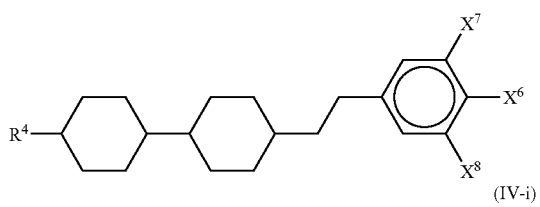

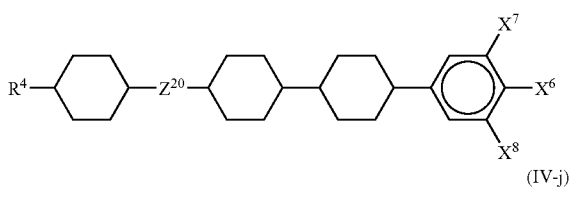

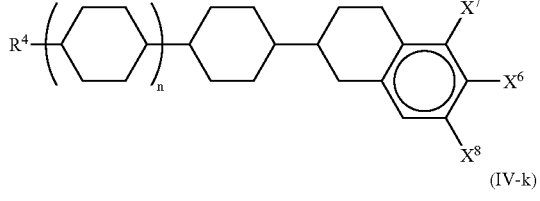

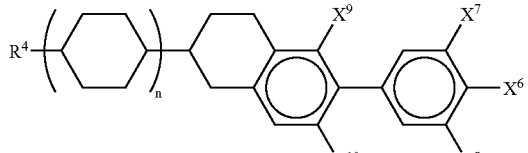

wherein $R^4$ represents an alkyl group having 1 to 10 carbon atoms, an alkoxyl group having 1 to 10 carbon atoms, an alkenyl group having 2 to 10 carbon atoms or an alkenyloxy group having 2 to 10 carbon atoms, $A^{20}$ represents a 1,4-phenylene group or a 1,4-cyclohexylene group, $Z^7$ represents a single bond or —CH$_2$—CH$_2$—, $X^6$ represents a fluorine atom, a chlorine atom, a difluoromethoxy group or a trifluoromethoxy group, and $X^7$ to $X^{11}$ each independently represents a hydrogen atom, a fluorine atom or a chlorine atom, more preferably a compound selected from the group of compounds represented by the general formulas (IV-a), (IV-f), (IV-g) and (IV-i), and most preferably two or more kinds of compounds selected from among these compounds.

To adjust physical properties such as refractive index anisotropy and viscosity, the liquid crystal composition can contain a compound represented by the general formula (II-c), for example, a compound selected from the group of compounds represented by the general formulas (V-a) to (V-n). To increase the refractive index anisotropy, the liquid crystal composition preferably contain a compound selected from the group of compounds represented by the general formulas (V-e), (V-f), (V-g), (V-h), (V-i), (V-k) and (V-l) and compounds represented by the general formulas (IV-b), (IV-c) and (IV-e). To decrease the viscosity, the liquid crystal composition preferably contains a compound selected from the group of compounds represented by the general formulas (V-a), (V-b), (V-c), (V-d) and (V-e). To broaden the temperature range of the liquid crystal, the liquid crystal composition preferably contains a compound selected from the group of compounds represented by the general formulas (V-j), (V-k), (V-l), (V-m) and (V-n) and compounds represented by the general formulas (IV-d), (IV-e), (IV-f), (IV-g), (IV-h), (IV-i) and (IV-j).

These liquid crystal compositions of the present invention exhibit a high upper temperature limit of the liquid crystal because the HTP value of an optically active compound is large and a desired natural pitch can be obtained by the addition of a small amount of the optically active compound. Furthermore, since the viscosity can be lowered, there can be obtained a liquid crystal composition which exhibits a high response speed and reduced drive voltage. The liquid crystal display device of the present invention will be described.

The liquid crystal display device of the present invention is characterized by using the liquid crystal composition of the present invention. TN type static driving, TN type/STN type simple matrix driving, active matrix driving, and phase transition type driving using a cholesteric liquid crystal can be applied. Also, the liquid crystal display device can be used in a device wherein the liquid crystal composition is formed in a polymer network or a polymer.

EXAMPLES

The present invention will be described in detail by way of Examples, but the present invention is not limited to the following Examples.

In the compositions of the following Examples and Comparative Examples, percentages are by weight and the symbol * represents the position of an asymmetric carbon.

Regarding chirality of a helical structure, the same helical structure as that of a right-handed screw is referred to as a clockwise helical structure, while the same helical structure as that of a left-handed screw is referred to as a counterclockwise helical structure. The chirality was decided by the contact method with a standard sample having a known helical structure.

The natural pitch of the helical structure was measured at 25° C. by the wedge method (Cano method). To measure temperature characteristics of the natural pitch, the same measurements were conducted at 0° C. and 50° C., in addition to the measurement at 25° C., and a change per unit temperature difference was determined by calculating according to the following equation.

$$\Delta P/\Delta T = (P\max - P\min)/(Tp\max - Tp\min)$$

where
$\Delta P/\Delta T$: change in natural pitch per 1° C. (μm/° C.)
Pmax: maximum value of natural pitch (μm)
Pmin: minimum value of natural pitch (μm)
Tpmax: temperature at which natural pitch exhibits maximum value (° C.)
Tpmin: temperature at which natural pitch exhibits minimum value (° C.)

The helical twisting power was determined in the following manner. That is, an optically active compound to be measured was added to a liquid crystal composition represented by the formula (XII-a):

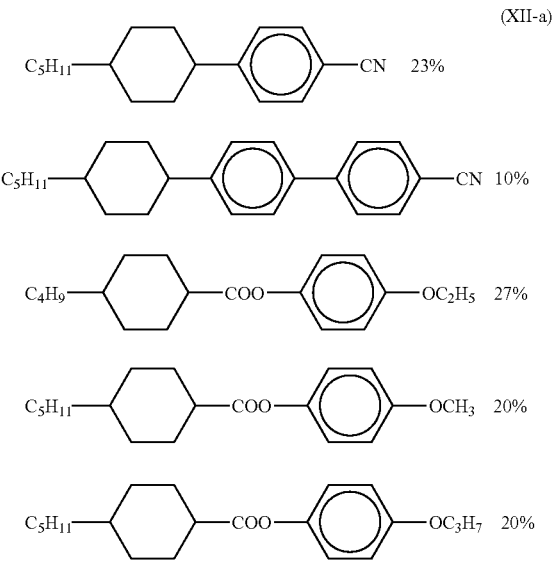

and a natural pitch was measured at a constant temperature, and then the helical twisting power was calculated by the following equation.

$$HTP = 1/(P \times 0.01 C)$$

where
helical twisting power: HTP (1/μm)
natural pitch: P (μm)
amount of optically active compound: C (% by weight)

The threshold voltage (Vth) is a threshold voltage (V) at 25° C. when a STN liquid crystal display device (STN-LCD) having a cell thickness d (μm) is formed. The applied drive waveform is 100 Hz square wave. The cell thickness d (μm) is decided by a relation of $\Delta n \cdot d = 0.90$ (Vth is a drive voltage at a transmittivity of 90%). The change in threshold voltage per unit temperature difference was calculated in the following manner.

$$\Delta E/\Delta T = \frac{(E\max - E\min)}{(TE\max - TE\min)} \times 1000$$

where
$\Delta E/\Delta T$: change in threshold voltage per 1° C. (mV/° C.)
Emax: maximum value of threshold voltage (V)
Emin: minimum value of threshold voltage (V)
TEmax: temperature at which threshold voltage exhibits maximum value (° C.)
TEmin: temperature at which threshold voltage exhibits minimum value (° C.)

Example 1

A compound represented by the formula (XI-a) was obtained by the following method.

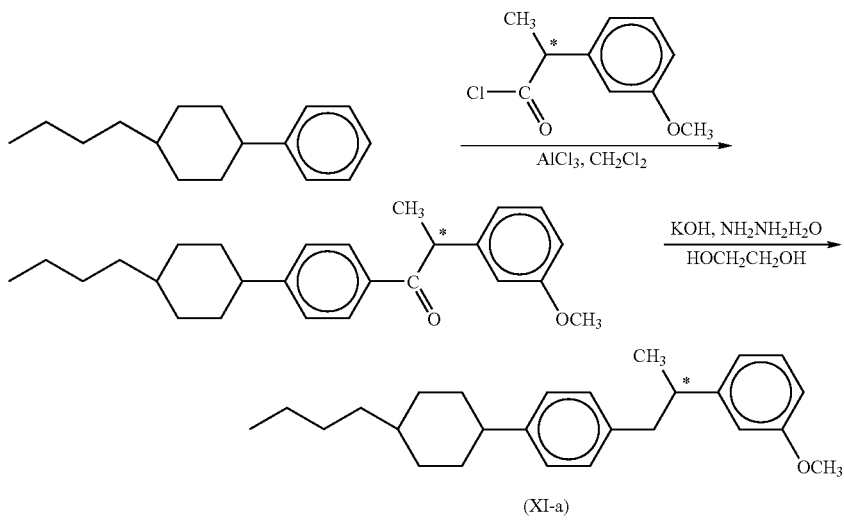

To a methylene chloride suspension of aluminum chloride, a methylene chloride solution of (R)-2-(3-methoxyphenyl)propionic acid chloride was added dropwise under ice cooling. After stirring at the same temperature for 15 minutes, a methylene chloride solution of trans-4-propylcyclohexylbenzene was added dropwise. After the completion of the reaction, the reaction system was added to iced water and the organic layer was separated by adding methylene chloride. The organic layer was washed twice with water and then washed with saturated brine. The aqueous layer was washed with methylene chloride and, after combining the organic layer, the solvent was concentrated to obtain a crude product of (R)-1-(4-cyclohexylphenyl)-2-(3-methoxyphenyl)-propan-1-one. To an ethylene glycol solution of the resulting crude product, hydrazine monohydrate was added and the solution was stirred at 110° C. while removing water as a by-product. After efflux of water has nearly terminated, excess hydrazine was distilled off by stirring at 120° C. The temperature of the reaction system was reduced and potassium hydroxide was added, followed by heating to 160° C. After the completion of the reaction, the temperature of the reaction system was reduced and water and toluene were added, followed by stirring. After separating the organic layer, the aqueous layer was washed with toluene and the organic layer was combined and then washed three times with water. The residue was washed with saturated brine and concentrated to obtain a crude product of a compound represented by the formula (XI-a). The resulting crude product was purified by column chromatography and recrystallized from ethanol to obtain (S)-1-{2-(3-methoxyphenyl)propyl}-4-(trans-4-propylcyclohexyl) benzene (S-isomer of the compound represented by the formula (XI-a)).

Example 2

In the same manner as in Example 1, (S)-1-{3,3,3-trifluoro-2-(3-methoxyphenyl)propyl}-4-(trans-4-propylcyclohexyl)benzene represented by the formula (XI-b):

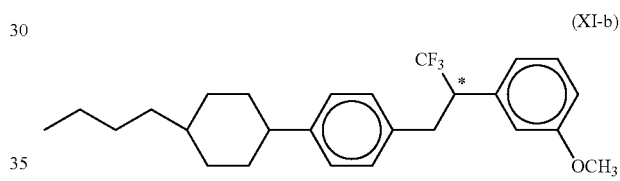

was obtained.

Example 3

A compound represented by the formula (XI-c) was obtained by the following method.

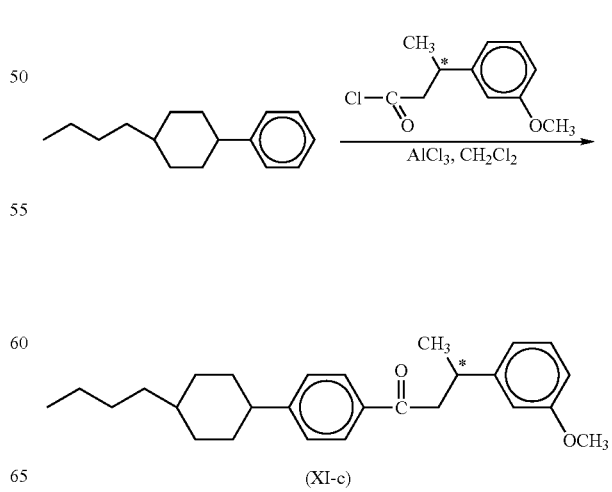

To a methylene chloride suspension of aluminum chloride, a methylene chloride solution of (R)-3-(3-methoxyphenyl)butyric acid chloride was added dropwise under ice cooling. After stirring at the same temperature for 15 minutes, a methylene chloride solution of trans-4-propylcyclohexylbenzene was added dropwise. After the completion of the reaction, the reaction system was added to iced water and the organic layer was separated by adding methylene chloride. The organic layer was washed twice with water and then washed with saturated brine. The aqueous layer was washed with methylene chloride and, after combining the organic layer, the solvent was concentrated to obtain a crude product of (R)-1-(4-cyclohexylphenyl)-3-(3-methoxyphenyl)-butan-1-one. The resulting crude product was purified by column chromatography and recrystallized from ethanol to obtain (R)-1-(4-cyclohexylphenyl)-3-(3-methoxyphenyl)-butan-1-one (R-isomer of the compound represented by the formula (XI-c)).

Example 4

A compound represented by the formula (XI-d) was obtained by the following method.

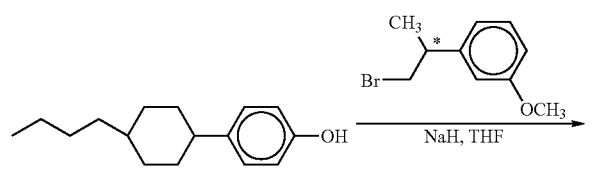

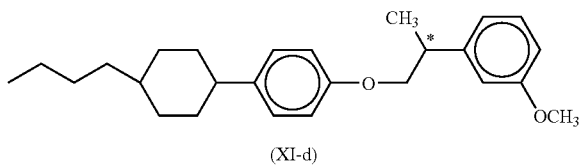

(XI-d)

To a tetrahydrofuran (THF) suspension of sodium hydride (dispersed in 50% mineral oil), a THF solution of trans-4-butylcyclohexylphenol was added dropwise. After foaming was terminated, a THF solution of (R)-2-(3-methoxyphenyl)bromopropane was added dropwise. After stirring at room temperature for 4 hours, the reaction system was added to water and the organic layer was separated by adding toluene. The aqueous layer was washed with toluene, and then the organic layer was combined and concentrated to obtain a crude product of a compound represented by the formula (XI-d). The resulting crude product was purified by column chromatography and recrystallized from ethanol to obtain (R)-1-{4-(trans-4-butylcyclohexyl)phenyloxy}-2-(3-methoxyphenyl)propane (R-isomer of the compound represented by the formula (XI-d)).

Example 5

A compound represented by the formula (XI-e) was obtained by the following method.

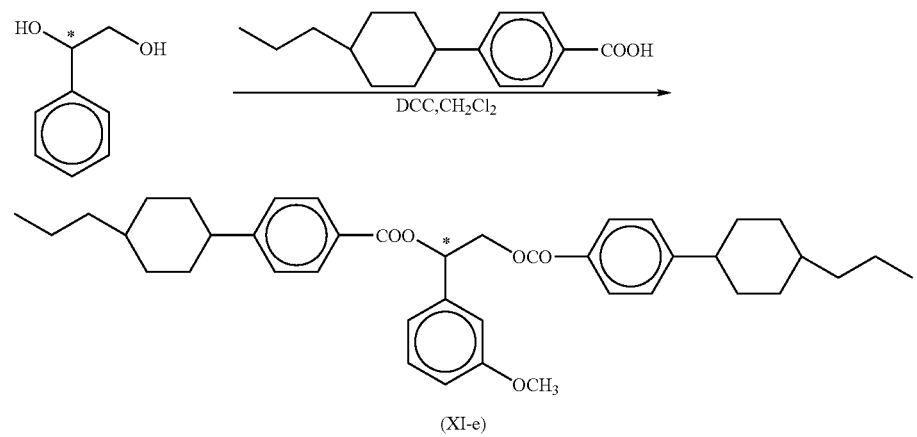

(XI-e)

A methylene chloride solution of (R)-1-phenylethylene glycol, 4-(trans-4-butylcyclohexyl)benzoic acid and 4-dimetylaminopyridine was stirred at 0° C. To the solution, 1,3-dicyclohexylcarbodiimide was added at the same temperature over 10 minutes, followed by heating to room temperature and further stirring at room temperature for 5 hours. After removing insoluble dicyclohexyl urea by filtration, the filtrate was washed in turn with 10% dilute hydrochloric acid, an aqueous saturated sodium hydrogen carbonate solution, water and saturated brine. The solvent was concentrated to obtain a crude product of a compound represented by the formula (XI-e). The resulting crude product was purified by column chromatography and recrystallized from ethanol to obtain bis{4-(trans-4-butylcyclohexyl)phenyl} (R)-1-(3-methoxyphenyl)succinate (R-isomer of the compound represented by the formula (XI-e)).

Example 6

A compound represented by the formula (XI-m) was obtained by the following method.

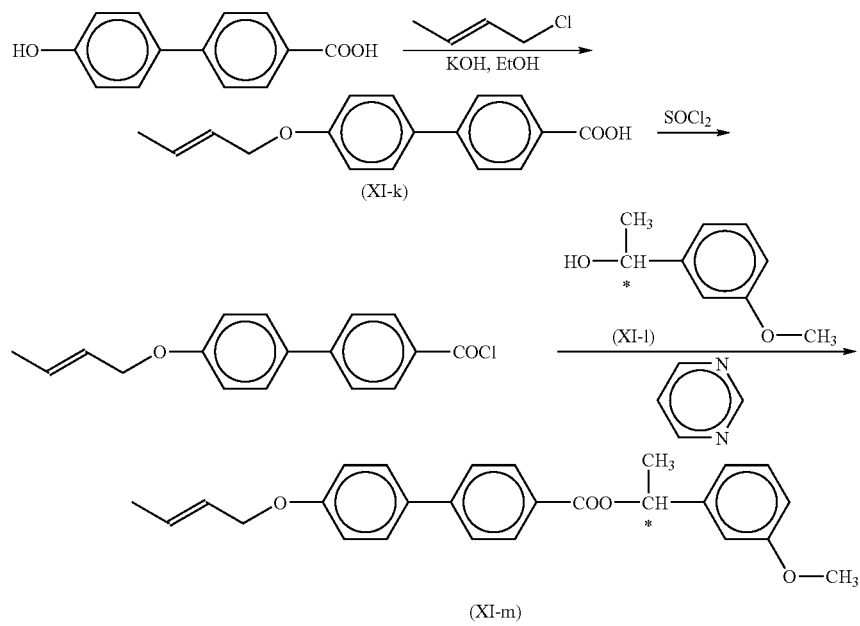

8.6 g of 4'-hydroxy-4-biphenylcarboxylic acid was added to hydrous ethanol containing 5.3 g of potassium hydroxide dissolved therein, followed by stirring at room temperature for 30 minutes. While heating at reflux, 5.5 g of crotyl chloride was added dropwise, followed by heating at reflux for 2 hours. After the completion of the reaction, ethanol was distilled off under reduced pressure and 50 ml of 18% HCl was added to deposit a crystal. The deposited crystal was collected by filtration, washed with water and then dried under reduced pressure to obtain 5.3 g of 4'-(2-butenyloxy)-4-biphenylcarboxylic acid (XI-k). Excess thionyl chloride was added, followed by heating at reflux for 2 hours. After the completion of the reaction, excess thionyl chloride was distilled off under reduced pressure. Then, 30 ml of pyrimidine and 2.6 g of (R)-1-(3-methoxyphenyl)ethanol (XI-l) were added to the resulting crude product and the reaction was conducted at 50° C. for one hour. After the completion of the reaction, the reaction product was extracted with toluene in the presence of hydrochloric acid, washed with water and dried, and then the solvent was distilled off under reduced pressure. The residue was recrystallized from methanol to obtain 5.1 g of 1-(3-methoxyphenyl)ethyl (R)-4'-(2-butenyloxy)-4-biphenylcarboxylate (R-isomer of the compound represented by the formula (XI-m).

Melting point: 108° C.

$^1$H-NMR (400 MHz, CDCl$_3$) 1.62 (d, 3H), 1.72 (d, 3H), 3.77 (s, 3H), 5.6–6.1 (m, 3H), 6.7–8.1 (m, 12H) IR (KBr) 1720 cm$^{-1}$ (C=O), 1265 cm$^{-1}$ (C—O) MS m/z 402 (M+)

In the same manner as described above, except that (S)-1-(3-methoxyphenyl)ethanol was used in place of (R)-1-(3-methoxyphenyl)ethanol, 1-(3-methoxyphenyl)ethyl (S)-4'-(2-butenyloxy)-4-biphenylcarboxylate (S-isomer of the compound represented by the formula (XI-m)) was obtained.

In this reaction, an optically active compound represented by the formula (XI-l) was produced by the following method.

An ester of an ester of a racemic alcohol as a raw material was produced and one enantiomer was preferentially hydrolyzed by using an enzyme such as lipase, and then the resulting optically active alcohol derivative was separated by column chromatography or distillation to obtain the compound.

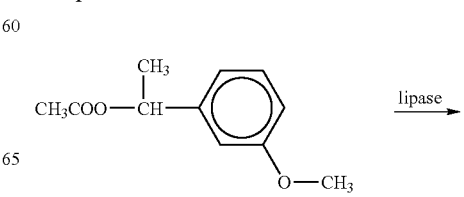

-continued

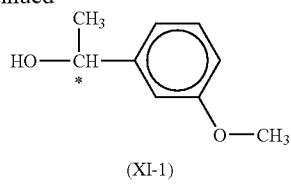

(XI-1)

Example 7

In the same manner as in Example 6, except that 4-{2-(4-butylphenyl)ethynyl}benzoic acid was used in place of 4'-(2-butenyloxy)-4-biphenylcarboxylic acid (XI-k), 1-(3-methoxyphenyl)ethyl (S)-4-{2-(4-butylphenyl)ethynyl}benzoate (S-isomer of the compound represented by the formula (XI-n)) was obtained.

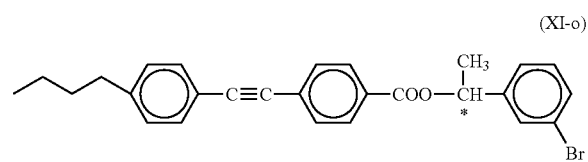

Melting point: 52° C.

$^1$H-NMR (400 MHz, CDCl$_3$) 0.80 (t, 3H), 1.23 (m, 4H), 1.52 (m, 2H), 1.58 (d, 3H), 2.52 (t, 2H), 3.72 (s, 3H), 6.01 (q, 1H), 6.7–8.0 (m, 12H) IR (KBr) 1710 cm$^{-1}$ (C=O), 1274 cm$^{-1}$ (C—O), 1257 cm$^{-1}$ MS m/z 412 (M+)

Example 8

In the same manner as in Example 6, except that 4-{2-(4-butylphenyl)ethynyl}benzoic acid was used in place of 4'-(2-butenyloxy)-4-biphenylcarboxylic acid (XI-k) and (S)-1(3-bromophenyl)ethanol (XI-l) was used in place of (R)-1-(3-methoxyphenyl)ethanol (XI-l), 1-(3-bromophenyl)ethyl (S)-4-{2-(4-butylphenyl)ethynyl}benzoate (S-isomer of the compound represented by the formula (XI-o)).

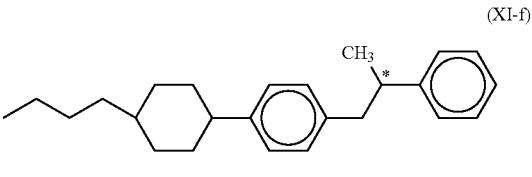

Melting point: 45° C.

$^1$H-NMR (400 MHz, CDCl$_3$) 0.81 (t, 3H), 1.25 (m, 4H), 1.51 (m, 2H), 1.59 (d, 3H), 2.53 (t, 2H), 5.99 (q, 1H), 7.0–8.0 (m, 12H) IR (KBr) 1710 cm$^{-1}$ (C=O), 1274 cm$^{-1}$ (C—O) MS m/z 460, 462 (M+)

Example 9

The natural pitch of a liquid crystal composition (A) comprising 1% of a compound represented by the formula (XI-a) obtained in Example 1 and 99% of a liquid crystal composition represented by the formula (XII-a) was measured and the HTP value of the compound represented by the formula (XI-a) was determined by the above-described calculation formula. As a result, it was 21.9 at 25° C.

Example 10

The natural pitch of a liquid crystal composition (B) comprising 1% of a compound represented by the formula (XI-b) obtained in Example 2 and 99% of a liquid crystal composition represented by the formula (XII-a) was measured and the HTP value of the compound represented by the formula (XI-b) was determined in the same manner as in Example 9. As a result, it was 24.1 at 25° C.

Comparative Example 1

The natural pitch of a liquid crystal composition (C) comprising 1% of a compound represented by the formula (XI-f):

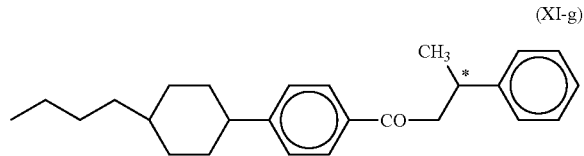

wherein a substituent does not exist at the meta-position of a phenyl group adjacent to an asymmetric carbon atom and 99% of a liquid crystal composition represented by the formula (XII-a) was measured and the HTP value of the compound represented by the formula (XI-f) was determined in the same manner as in Example 9. As a result, it was 16.2 at 25° C.

Example 11

The natural pitch of a liquid crystal composition (D) comprising 1% of a compound represented by the formula (XI-c) obtained in Example 3 and 99% of a liquid crystal composition represented by the formula (XII-a) was measured and the HTP value of the compound represented by the formula (XI-c) was determined in the same manner as in Example 9. As a result, it was 27.1 at 25° C.

Comparative Example 2

The natural pitch of a liquid crystal composition (E) comprising 1% of a compound represented by the formula (XI-g):

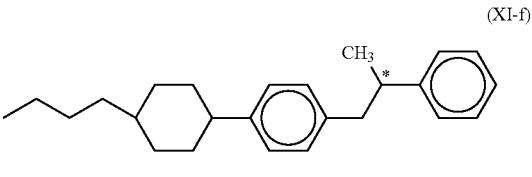

wherein a substituent does not exist at the meta-position of a phenyl group adjacent to an asymmetric carbon atom and 99% of a liquid crystal composition represented by the formula (XII-a) was measured and the HTP value of the compound represented by the formula (XI-g) was determined in the same manner as in Example 9. As a result, it was 19.8 at 25° C.

Example 12

The natural pitch of a liquid crystal composition (F) comprising 1% of a compound represented by the formula (XI-d) obtained in Example 4 and 99% of a liquid crystal composition represented by the formula (XII-a) was measured and the HTP value of the compound represented by the formula (XI-d) was determined in the same manner as in Example 9. As a result, it was 25.3 at 25° C.

Comparative Example 3

The natural pitch of a liquid crystal composition (G) comprising 1% of a compound represented by the formula (XI-h):

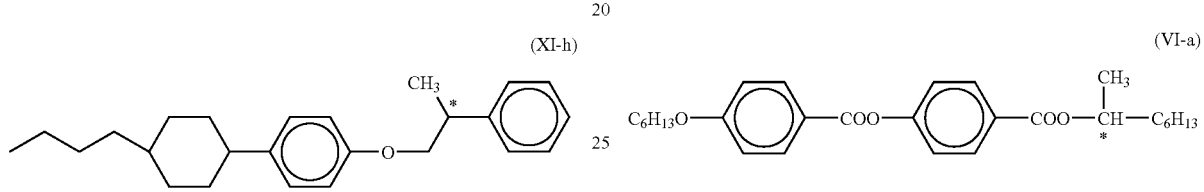

(XI-h)

wherein a substituent does not exist at the meta-position of a phenyl group adjacent to an asymmetric carbon atom and 99% of a liquid crystal composition represented by the formula (XII-a) was measured and the HTP value of the compound represented by the formula (XI-h) was determined in the same manner as in Example 9. As a result, it was 18.5 at 25° C.

Example 13

The natural pitch of a liquid crystal composition (H) comprising 1% of a compound represented by the formula (XI-e) obtained in Example 5 and 99% of a liquid crystal composition represented by the formula (XII-a) was measured and the HTP value of the compound represented by the formula (XI-e) was determined in the same manner as in Example 9. As a result, it was 41.6 at 25° C.

Comparative Example 4

The natural pitch of a liquid crystal composition (I) comprising 1% of a compound represented by the formula (XI-i):

wherein a substituent does not exist at the meta-position of a phenyl group adjacent to an asymmetric carbon atom and 99% of a liquid crystal composition represented by the formula (XII-a) was measured and the HTP value of the compound represented by the formula (XI-i) was determined in the same manner as in Example 9. As a result, it was 34.7 at 25° C.

Comparative Example 5

The natural pitch of a liquid crystal composition (J) comprising 1% of a compound (product name of S-isomer: S-811) represented by the formula (VI-a):

(VI-a)

which is commonly used as a liquid crystal composition and 99% of a liquid crystal composition represented by the formula (XII-a) was measured and the HTP value of the compound represented by the formula (VI-a) was determined in the same manner as in Example 9. As a result, it was 10.6 at 0° C., 10.5 at 25° C., and 10.1 at 50° C.

It is known that the compound represented by the formula (VI-a) induces a counterclockwise helical structure.

Example 14

The natural pitch of a liquid crystal composition (K) comprising 1% of a compound represented by the formula (XI-m) obtained in Example 6 and 99% of a liquid crystal composition represented by the formula (XII-a) was measured and the HTP value of a compound represented by the formula (XI-m) was determined in the same manner as in Example 9. As a result, it was 27.5 at 0° C., 27.6 at 25° C., and 28.8 at 50° C.

The chirality of the helical structure was confirmed by the contact method. As a result, the compound as the R-isomer

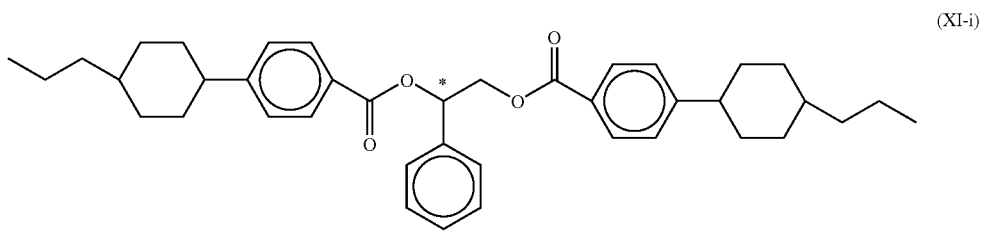

(XI-i)

represented by the formula (XI-m) induces a clockwise helical structure, while the compound as the S-isomer represented by the formula (XI-m) induces a counterclockwise helical structure.

Comparative Example 6

The natural pitch of a liquid crystal composition (M) comprising 1% of a compound represented by the formula (VI-e):

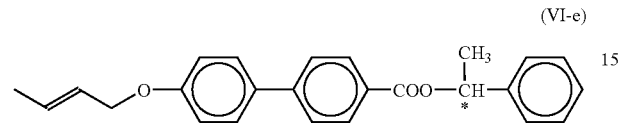

wherein a substituent does not exist at the meta-position of a phenyl group adjacent to an asymmetric carbon atom and 99% of a liquid crystal composition represented by the formula (XII-a) was measured and the HTP value of the compound represented by the formula (VI-e) was determined in the same manner as in Example 9. As a result, it was 20.4 at 25° C.

Comparative Example 7

The natural pitch of a liquid crystal composition (N) comprising 1% of a compound represented by the formula (XI-p):

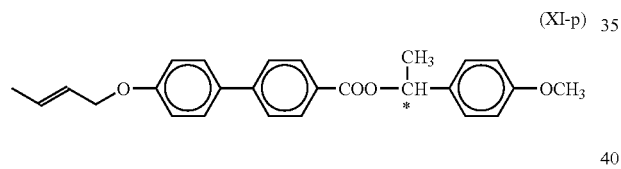

wherein a substituent exists at the para-position of a phenyl group adjacent to an asymmetric carbon atom and 99% of a liquid crystal composition represented by the formula (XII-a) was measured and the HTP value of the compound represented by the formula (XI-p) was determined in the same manner as in Example 9. As a result, it was 2.7 at 25° C.

Example 15

The natural pitch of a liquid crystal composition (O) comprising 1% of a compound represented by the formula (XI-n) obtained in Example 7 and 99% of a liquid crystal composition represented by the formula (XII-a) was measured and the HTP value of the compound represented by the formula (XI-n) was determined in the same manner as in Example 9. As a result, it was 21.8 at 25° C.

An S-isomer of the compound represented by the formula (XI-n) induced a counterclockwise helical structure.

Example 16

The natural pitch of a liquid crystal composition (P) comprising 1% of a compound represented by the formula (XI-o) obtained in Example 8 and 99% of a liquid crystal composition represented by the formula (XII-a) was measured and the HTP value of the compound represented by the formula (XI-o) was determined in the same manner as in Example 9. As a result, it was 23.9 at 0° C., 24.2 at 25° C., and 24.9 at 50° C.

An S-isomer of the compound represented by the formula (XI-o) induced a counterclockwise helical structure.

Comparative Example 8

The natural pitch of a liquid crystal composition (Q) comprising 1% of a compound represented by the formula (VI-f):

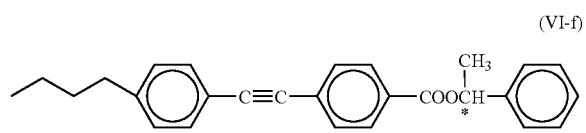

wherein a substituent exists at the meta-position of a phenyl group adjacent to an asymmetric carbon atom and 99% of a liquid crystal composition represented by the formula (XII-a) was measured and the HTP value of the compound represented by the formula (VI-f) was determined in the same manner as in Example 9. As a result, it was 17.2 at 25° C.

Comparative Example 9

The natural pitch of a liquid crystal composition (R) comprising 1% of a compound represented by the formula (VI-d):

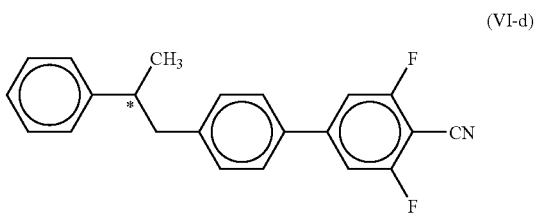

wherein a substituent exists at the meta-position of a phenyl group adjacent to an asymmetric carbon atom and 99% of a liquid crystal composition represented by the formula (XII-a) was measured and the HTP value of the compound represented by the formula (VI-d) was determined in the same manner as in Example 9. As a result, it was 16.1 at 0° C., 16.4 at 25° C., and 16.4 at 50° C.

Comparative Example 10

The natural pitch of a liquid crystal composition (S) comprising 1% of a compound (product name: CB-15) represented by the formula (VI-b):

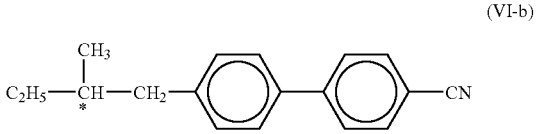

which is commonly used as a liquid crystal composition and 99% of a liquid crystal composition represented by the formula (XII-a) was measured and the HTP value of the compound represented by the formula (VI-b) was determined in the same manner as in Example 9. As a result, it was 8.6 at 0° C., 8.4 at 25° C., and 7.8 at 50° C.

The effects of an increase in HTP are determined from the HTP values at 25° C. of the Examples and Comparative Examples. The results are shown in Table 1.

TABLE 1

Effects of method of increasing HTP

| | Compound | Composition | HTP (1/μm) | Increase rate (%) | Remarks |
|---|---|---|---|---|---|
| Example 9 | XI-a | A | 21.9 | 35 | |
| Comparative Example 1 | XI-f | C | 16.2 | | |
| Example 11 | XI-c | D | 27.1 | 37 | |
| Comparative Example 2 | XI-g | E | 19.8 | | |
| Example 12 | XI-d | F | 25.3 | 37 | |
| Comparative Example 3 | XI-h | G | 18.5 | | |
| Example 13 | XI-e | H | 41.6 | 20 | |
| Comparative Example 4 | XI-i | I | 34.7 | | |
| Example 14 | XI-m | K | 27.6 | 35 | Numerical in parenthesis means an increase rate from p-isomer (XI-p) |
| Comparative Example 6 | VI-e | M | 20.4 | (920) | |
| Comparative Example 7 | XI-p | N | 2.7 | | |
| Example 15 | XI-n | O | 21.8 | 27 | Y1 = MeO |
| Example 16 | XI-o | P | 24.2 | 41 | Y1 = Br |
| Comparative Example 8 | VI-f | Q | 17.2 | | |

Increase ratio: {(HTP2/HTP1) − 1} × 100
HTP1: HTP before practice of the method of the present invention
HTP2: HTP after practice of the method of the present invention As is apparent from Table 1, the effect of increasing HTP of the present invention is seen. That is, compounds described in Example 9 (XI-a) and Comparative Example 1 (XI-f), compounds described in Example 11 (XI-c) and Comparative Example 2 (XI-g), compounds described in Example 12 (XI-d) and Comparative Example 3 (XI-h), compounds described in Example 13 (XI-e) and Comparative Example 4 (XI-i), compounds described in Example 14 (XI-m) and Comparative Example 6 (XI-e) and compounds described in Example 15 (XI-n) and 16 (XI-o) and Comparative Example 8 (VI-f) respectively have the same skeleton, except that a substituent exists at the meta-position of a phenyl group adjacent to an asymmetric carbon in the compounds described in the Examples. As is apparent from a comparison between them, the method of the present invention can increase HTP by 20% to 41%.

The compound (XI-p) described in Comparative Example 7 has the same skeleton as that of the compound described in Example 14, except that it has a substituent at the para-position. In this case, HTP drastically decreases and an increase rate from the para-substituted compound (XI-p) to the meta-substituted compound (XI-n) is very large.

To illustrate the effect of the optically active compound of the present invention, the results of a comparison of HTP at 25° C. with a conventionally used optically active compound are shown in Table 2.

TABLE 2

Comparison with conventional optically active compound

| | Optically active compound | Liquid crystal composition | HTP (1/μm) |
|---|---|---|---|
| Example 9 | XI-a | A | 21.9 |
| Example 10 | XI-b | B | 24.1 |
| Comparative Example 5 | VI-a | J | 10.5 |
| Comparative Example 9 | VI-d | R | 16.4 |
| Comparative Example 10 | VI-b | S | 8.4 |

As is apparent from Table 2, the conventionally used optically active compound has low HTP and is inferior to the compound of the present invention. As is apparent from aforementioned Table 1, the effect of the meta-substituted compound is recognized.

Temperature characteristics of the HTP value are shown in Table 3.

TABLE 3

| | | | HTP (1/μm) | | |
|---|---|---|---|---|---|
| | Compound | Composition | 0° C. | 25° C. | 50° C. |
| Comparative Example 5 | VI-a | J | 10.6 | 10.5 | 10.1 |
| Example 14 | XI-m | K | 27.5 | 27.6 | 28.8 |
| Example 16 | XI-o | P | 23.9 | 24.2 | 24.9 |
| Comparative Example 9 | VI-d | R | 16.1 | 16.4 | 16.4 |
| Comparative Example 10 | VI-b | S | 8.6 | 8.4 | 7.8 |

The HTP values decrease as the temperature increases in the compounds of the Comparative Examples, while the HTP value increase as the temperature increases in the compounds of the Examples 14 and 16.

Example 17

The natural pitch of a liquid crystal composition (T) comprising 1% of a compound represented by the formula (XI-a) and 99% of a liquid crystal composition represented by the formula (XII-b) was measured. As a result, it was 5.44 μm at 0° C., 5.46 μm at 25° C., and 5.49 μm at 50° C. A change in natural pitch per 1° C. of the composition (T) was 0.001 μm/° C.

(XII-b)
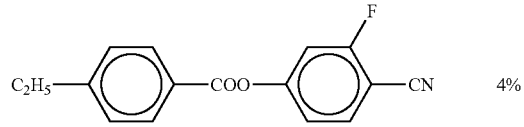 4%
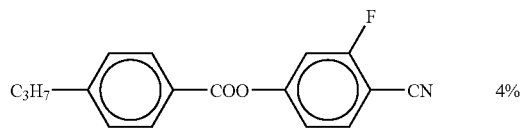 4%
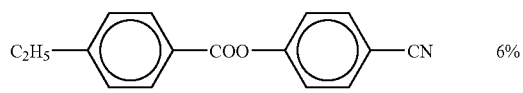 6%
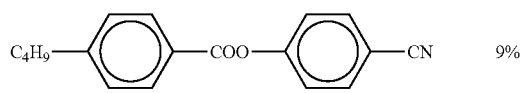 9%
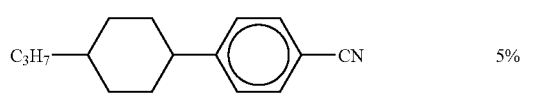 5%
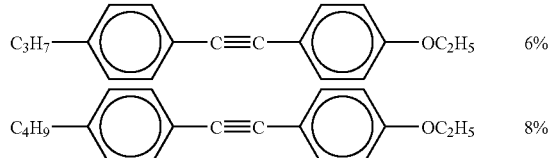 6%
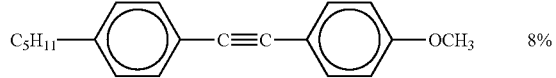 8%
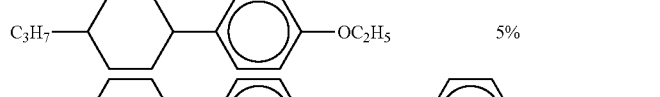 8%
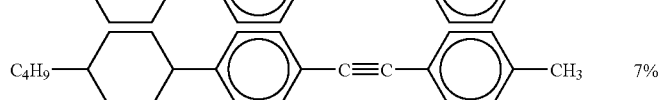 5%
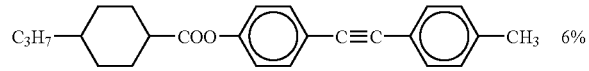 8%
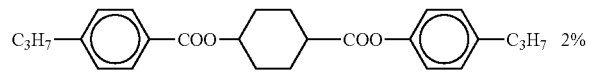 7%
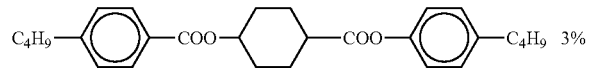 6%
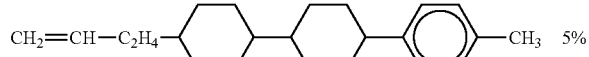 2%
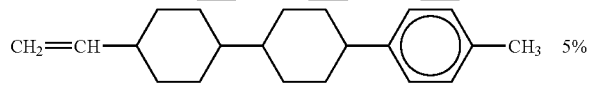 3%
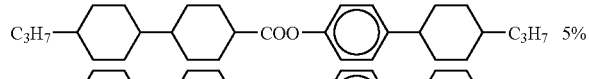 5%
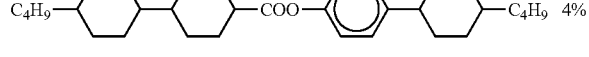 5%
C$_3$H$_7$—⬡—⬡—COO—◯—⬡—C$_3$H$_7$  5%
C$_4$H$_9$—⬡—⬡—COO—◯—⬡—C$_4$H$_9$  4%

Comparative Example 11

The natural pitch of a liquid crystal composition (U) comprising 1% of a compound represented by the formula (XI-f) and 99% of a liquid crystal composition represented by the formula (XII-b) was measured. As a result, it was 7.32 µm at 0° C., 7.37 µm at 25° C., and 7.51 µm at 50° C. A change in natural pitch per 1° C. of the composition (U) was 0.0038 µm/° C.

Example 18

1% of a compound represented by the formula (XI-e) was added to a liquid crystal composition (XII-b) and the natural pitch of the resulting liquid crystal composition (V) was measured. As a result, it was 3.16 µm at 0° C., 2.96 µm at 25° C., and 2.92 µm at 50° C. A change in natural pitch per 1° C. of the composition (V) was 0.0048 µm/° C.

Comparative Example 12

The natural pitch of a liquid crystal composition (W) comprising 1% of a compound represented by the formula (XI-i) and 99% of a liquid crystal composition represented by the formula (XII-b) was measured. As a result, it was 3.81 µm at 0° C., 3.56 µm at 25° C., and 3.51 µm at 50° C. A change in natural pitch per 1° C. of the composition (W) was 0.006 µm/° C.

Comparative Example 13

The natural pitch of a liquid crystal composition (X) comprising 1% of a compound represented by the formula (VI-a) and 99% of a liquid crystal composition represented by the formula (XII-b) was measured. As a result, it was 9.66 µm at 0° C., 9.86 µm at 25° C., and 10.33 µm at 50° C. A change in natural pitch per 1° C. of the composition (X) was 0.013 µm/° C.

As is apparent from a comparison between Example 17 and Comparative Example 11 and a comparison between Example 18 and Comparative Example 12, the liquid crystal compositions of Examples 17 and 18 exhibit small temperature dependency of the natural pitch.

Example 19

A compound represented by the formula (XI-a) was added to a liquid crystal composition represented by the formula (XII-b) so that the natural pitch was 0.35 µm, thereby to produce a cholesteric liquid crystal composition (Y). The cholesteric-isotropic transition temperature of the resulting composition (Y) was measured. As a result, it was 83.1° C.

Comparative Example 14

A compound represented by the formula (XI-f) was added to a liquid crystal composition represented by the formula (XII-b) so that the natural pitch was 0.35 µm, thereby to produce a cholesteric liquid crystal composition (Z). The cholesteric-isotropic transition temperature of the resulting composition (Z) was measured. As a result, it was 74.6° C.

Example 20

A compound represented by the formula (XI-e) was added to a liquid crystal composition represented by the formula (XII-b) so that the natural pitch was 0.35 µm, thereby to produce a cholesteric liquid crystal composition (AA). The cholesteric-isotropic transition temperature of the resulting composition (AA) was measured. As a result, it was 99.8° C.

Comparative Example 15

A compound represented by the formula (XI-i) was added to a liquid crystal composition represented by the formula (XII-b) so that the natural pitch was 0.35 µm, thereby to produce a cholesteric liquid crystal composition (AB). The cholesteric-isotropic transition temperature of the resulting composition (AB) was measured. As a result, it was 95.3° C.

Comparative Example 16

A compound represented by the formula (VI-a) was added to a liquid crystal composition represented by the formula (XII-b) so that the natural pitch was 0.35 µm, thereby to produce a cholesteric liquid crystal composition (AC). The cholesteric-isotropic transition temperature of the resulting composition (AC) was measured. As a result, it was 63.8° C.

As is apparent from a comparison between Example 19 and Comparative Example 14 and a comparison between Example 20 and Comparative Example 15, since the compounds of the present invention have large HTP, the amount required to obtain the same natural pitch can be reduced. Therefore, reduction of the cholesteric-isotropic transition temperature can be suppressed in the liquid crystal compositions of the present invention, and thus a liquid crystal composition having a high upper temperature limit of the liquid crystal can be obtained.

Example 21

A cholesteric liquid crystal composition (AD) having a natural pitch of 0.35 µm and a selective reflection wavelength of 550 nm, comprising 89.2% of a liquid crystal composition represented by the formula (XII-c):

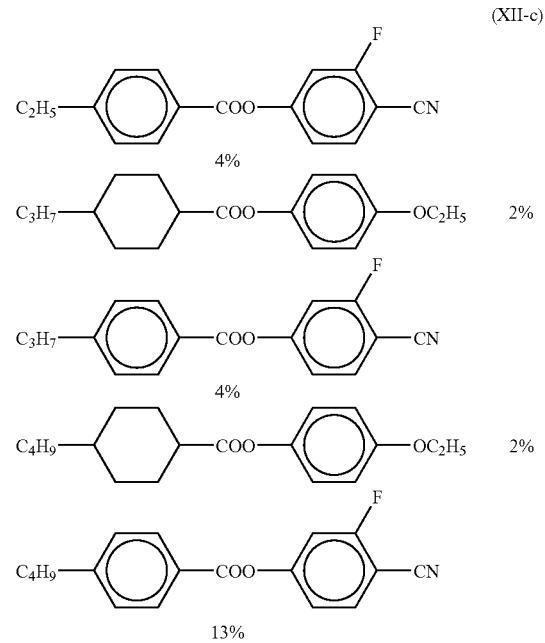

-continued

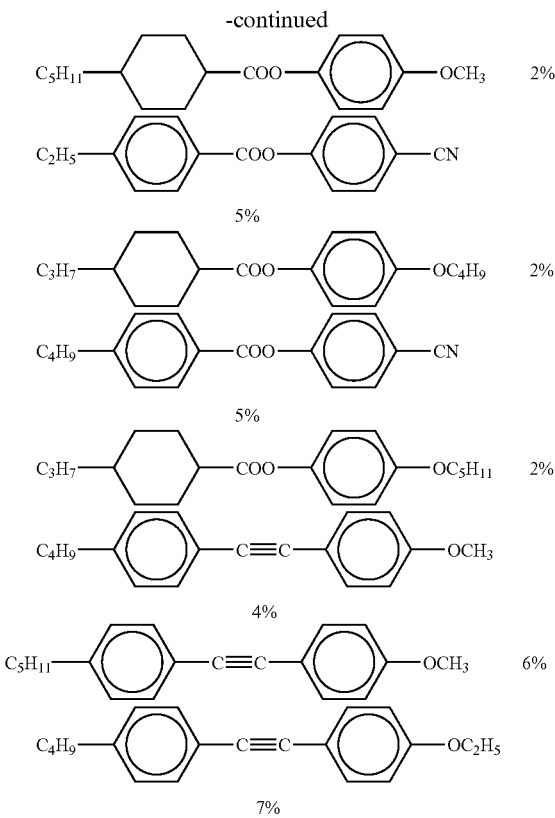

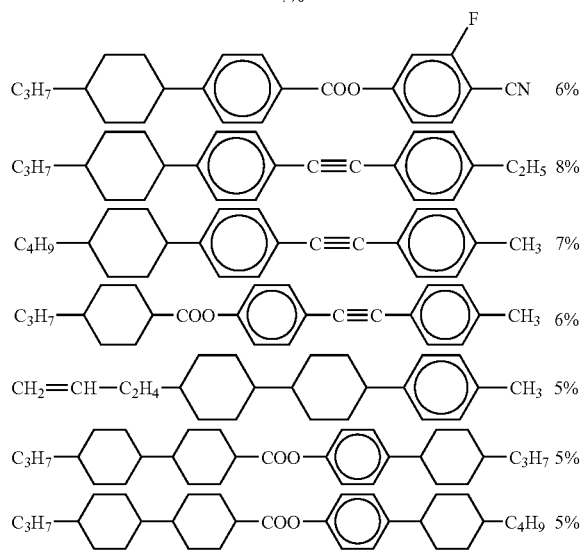

and 10.8% of a chiral compound represented by the formula (XI-m) was produced. The cholesteric-isotropic transition temperature of the resulting cholesteric liquid crystal composition (AD) was measured. As a result, it was 95° C.

Comparative Example 17

A cholesteric liquid crystal composition (AE) having a natural pitch of 0.35 μm and a selective reflection wavelength of 553 nm, comprising 83% of a liquid crystal composition represented by the formula (XII-c) and 17% of a chiral compound represented by the formula (XI-e) was produced. The cholesteric-isotropic transition temperature of the resulting cholesteric liquid crystal composition (AE) was measured. As a result, it was 83.4° C.

Comparative Example 18

A cholesteric liquid crystal composition (AF) having a natural pitch of 0.35 μm and a selective reflection wavelength of 552 nm, comprising 60.5% of a liquid crystal composition represented by the formula (XII-c) and 39.5% of a chiral compound represented by the formula (VI-b) was produced. The cholesteric-isotropic transition temperature of the resulting cholesteric liquid crystal composition (AF) was measured. As a result, it was 61.0° C.

As is apparent from a comparison between Example 21 and Comparative Examples 17 and 18, since the chiral compound represented by the formula (XI-m) of the present invention has large HTP, the amount required to obtain the same natural pitch can be reduced. Therefore, reduction of the cholesteric-isotropic transition temperature can be suppressed in the liquid crystal compositions of the present invention, and thus a liquid crystal composition having a high upper temperature limit of the liquid crystal can be obtained.

Also in cholesteric liquid crystal display devices filled with these cholesteric liquid crystal compositions, a display element using the cholesteric liquid crystal composition of Example 21 had a broader cholesteric temperature range.

Example 22

A liquid crystal composition (AG) comprising 99.7% of a liquid crystal composition represented by the formula (XII-d):

(XII-d)

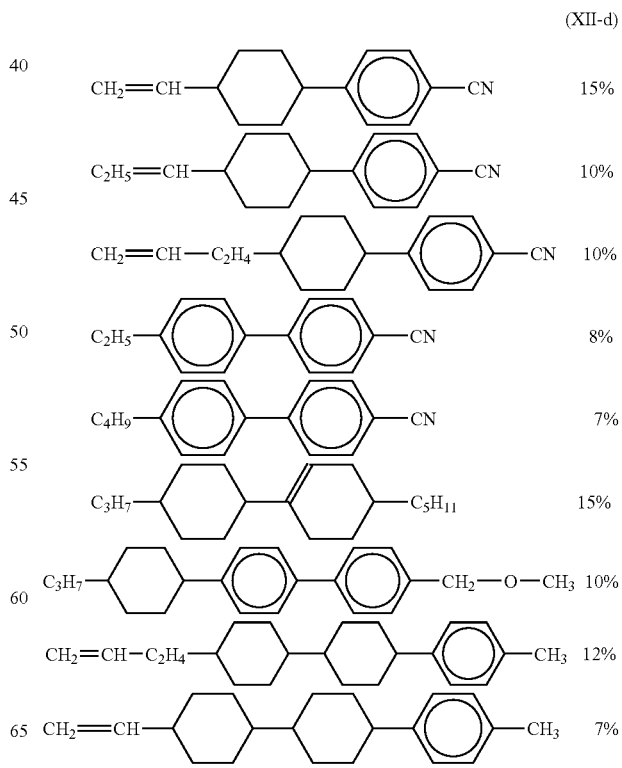

-continued

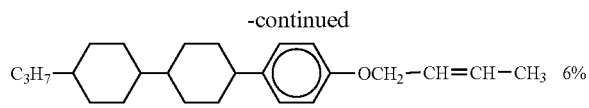 6% and 0.3% of a chiral compound represented by the formula (XI-m) was produced. An STN cell having a cell gap of 6.7 μm and a twist angle of 2700 was filled with the resulting liquid crystal composition (AG) and the threshold value was measured while changing the measuring temperature. As a result, it was 2.123 V at 0° C., 2.086 V at 10° C., 2.026 V at 25° C., and 1.941 V at 40° C. Thus, a change in threshold voltage per unit temperature difference was 4.55 mV/° C.

Comparative Example 19

A liquid crystal composition (AH) comprising 99.3% of a liquid crystal composition represented by the formula (XII-d) and 0.7% of a chiral compound represented by the formula (VI-a) was produced. An STN cell having a cell gap of 6.7 μm and a twist angle of 2700 was filled with the resulting liquid crystal composition (AH) and the threshold value was measured while changing the measuring temperature. As a result, it was 2.199 V at 0° C., 2.140 V at 10° C., 2.057 V at 25° C., and 1.941 V at 40° C. Thus, a change in threshold voltage per unit temperature difference was 6.45 mV/° C.

As is apparent from a comparison of the change in threshold voltage per unit temperature difference of the liquid crystal compositions shown in Example 22 and Comparative Example 19, the liquid crystal composition of Example 6 exhibits small temperature dependency of the threshold value.

What is claimed is:

1. A method of increasing a helical twisting power HTP (1/μm)

$$HTP=1/(P\times 0.01C)$$

where C represents an amount (% by weight) of an optically active compound and P represents a natural pitch (μm) in a compound having a partial structure represented by the formula (A):

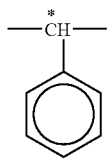 (A)

wherein * represents the position of an asymmetric carbon atom, which has an asymmetric carbon atom, said method comprising replacing a partial structure represented by the above formula (A) by a partial structure represented by the formula (B):

 (B)

wherein * represents the position of an asymmetric carbon atom, and $Y^1$ represents an alkyl group having 1 to 10 carbon atoms, an alkenyl group having 2 to 10 carbon atoms, a fluorine atom, a chlorine atom, a bromine atom, an iodine atom, a cyano group or an isothiocyanate group, the alkyl group or the alkenyl group is not substituted or can have one, or two or more fluorine atoms, chlorine atoms, cyano groups, methyl groups or trifluoromethyl groups as a substituent, and one, or two or more methylene groups existing in the alkyl group or the alkenyl group may be substituted with —CO— or may be substituted with an oxygen atom or —COO— in such a manner that oxygen atoms are not directly bonded to each other.

2. An optically active compound represented by the general formula (I):

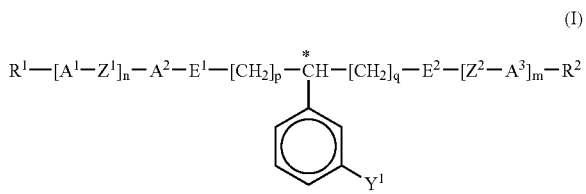 (I)

wherein * represents the position of an asymmetric carbon, $R^1$ and $R^2$ each independently represents an alkyl group having 1 to 10 carbon atoms, an alkenyl group having 2 to 10 carbon atoms, a hydrogen atom, a fluorine atom, a chlorine atom, a bromine atom, an iodine atom, a cyano group or an isothiocyanate group, the alkyl group or the alkenyl group is not substituted or can have one, or two or more fluorine atoms, chlorine atoms, cyano groups, methyl groups or trifluoromethyl groups as a substituent, and one, or two or more methylene groups existing in the alkyl group or the alkenyl group may be substituted with —CO— or may be substituted with an oxygen atom or —COO— in such a manner that oxygen atoms are not directly bonded to each other, $A^1$, $A^2$ and $A^3$ each independently represents a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a 1,2,3,4-tetrahydronaphthalene-2,6-diyl group, a 2,6-naphthylene group, an indane-2,5-diyl group, a phenanthrene-2,7-diyl group, a 9,10-dihydrophenanthrene-2,7-diyl group, a 1,2,3,4,4a,9,10a -octahydrophenanthrene-2,7-diyl group or a fluorene-2,7-diyl group, and the 1,4-phenylene group, the 1,2,3,4-tetrahydronaphthalene-2,6-diyl group, the 2,6-naphthylene group, phenanthrene-2,7-diyl group, the 9,10-dihydrophenanthrene-2,7-diyl group, the 1,2,3,4, 4a,9,10a-octahydrophenanthrene-2,7-diyl group and the fluorene-2,7-diyl group are not substituted or can have one, or two or more fluorine atoms, chlorine atoms, trifluoromethyl groups, trifluoromethoxy groups or methyl groups as a substituent, $Z^1$ and $Z^2$ each independently represents a single bond, —CO—, —COO—, —OCO—, —CH═N—, —N═CH—, —C≡C—, —CH$_2$CH$_2$—, —CH$_2$CH$_2$CH$_2$—, —CH$_2$CH$_2$CH$_2$CH$_2$—, —CH$_2$O—, —OCH$_2$—, —CF$_2$O—, —OCF$_2$—, —CH═N—N═CH—, —CF═CF—, —CH═CH—, —CH$_2$CH$_2$CH═CH—, —CH═CHCH$_2$CH$_2$— or —CH$_2$CH═CHCH$_2$—, $Y^1$ represents an alkyl group having 1 to 10 carbon atoms, an alkenyl group having 2 to 10 carbon atoms, a fluorine atom, a chlorine atom, a bromine atom, an iodine atom, a cyano group or an isothiocyanate group, the alkyl group or the alkenyl group is not substituted or can have one, two or more fluorine atoms, chlorine atoms, cyano groups, methyl groups or trifluoromethyl groups as a substituent, and one, or two or more methylene groups existing in the alkyl group or the alkenyl group may be substituted with —CO— or may be substituted with an oxygen atom or —COO— in such a manner that oxygen atoms are not directly bonded to each other, $E^1$ and $E^2$ each independently represents a single bond, —O—, —CO—, —COO—, —OCO—, —CH$_2$—, —CH$_2$CH$_2$—, —CH$_2$O—, —OCH$_2$—, —COCH$_2$—, —CH$_2$CO—, —COOCH$_2$—, —OCOCH$_2$—, —CH$_2$COO— or —CH$_2$OCO—, m, p and q each independently represents 0, 1 or 2 and, when m represents 2, the two groups $Z^2$ or the two groups $A^3$ may be the same or different, and n represents 1 or 2 and, when n represents 2, the two groups $A^1$ or the two groups $Z^2$ may be the same or different, and any oxygen atom in $E^2$ and any oxygen atom in $Z^2$ are not adjacent to each other.

3. The optically active compound according to claim 2, wherein m and q represent 0, $E^2$ represents a single bond, and $R^2$ represents a methyl group or a trifluoromethyl group.

4. The optically active compound according to claim 2, wherein $Y^1$ represents an alkyl group having 1 to 3 carbon atoms, an alkoxy group having 1 to 3 carbon atoms, an alkenyl group having 2 to 3 carbon atoms, an alkenyloxy group having 2 to 3 carbon atoms, a fluorine atom, a chlorine atom or a bromine atom, and the alkyl group, the alkenyl group, the alkoxy group and the alkenyloxy group are not substituted or can one, or two or more fluorine atoms or chlorine atoms as a substituent.

5. The optically active compound according to claim 4, wherein m and q represent 0, $E^2$ represents a single bond, and $R^2$ represents a methyl group or a trifluoromethyl group.

6. The optically active compound according to claim 5, wherein p represents 0 and $E^1$ represents —CH$_2$—, —O—, —CO—, —COO—, —OCO—, —CH$_2$CH$_2$—, —CH$_2$O——OCH$_2$—, —COCH$_2$— or —CH$_2$CO—.

7. The optically active compound according to claim 5, wherein p represents 0, $E^1$ represents —COO—, and $R^2$ represents a methyl group.

8. The optically active compound according to claim 6, wherein $A^1$ and $A^2$ each independently represents a 1,4-phenylene group or a 1,4-cyclohexylene group, and $E^1$ represents —CH$_2$— or —COO—.

9. The optically active compound according to claim 4, wherein n represents 1, m represents 2, and $Z^1$ and $Z^2$ represent a single bond.

10. The optically active compound according to claim 9, wherein p represents 0, q represents 1, and $E^1$ and $E^2$ each independently represents —CH$_2$—, —COO— or —OCO—.

11. The optically active compound according to claim 10, wherein $A^1$, $A^2$ and $A^3$ each independently represents a 1,4-phenylene group or a 1,4-cyclohexylene group.

12. The optically active compound according to claim 2, wherein $Y^1$ represents a fluorine atom, a methyl group, a methoxy group, a trifluoromethyl group or a trifluoromethoxy group.

13. A nematic or cholesteric liquid crystal composition comprising 0.01% by weight to 50% by weight of the optically active compound of claim 2.

14. The nematic or cholesteric liquid crystal composition according to claim 13, comprising a cholesterol derivative or one to five kinds of optically active compounds represented by the general formula (IX-a):

R'—(P$^1$-L$^1$)$_n$-P$^2$-L$^2$-P$^3$-R'' (IX-a)

wherein R' and R'' each independently represents an alkyl group having 1 to 10 carbon atoms, an alkenyl group having 2 to 10 carbon atoms, a hydrogen atom, a fluorine atom, a chlorine atom, a bromine atom, an iodine atom, a cyano group or an isothiocyanate group, the alkyl group or the alkenyl group is not substituted or can have one, two or more fluorine atoms, chlorine atoms, cyano groups, methyl groups or trifluoromethyl groups as a substituent, and one, or two or more methylene groups existing in the alkyl group or the alkenyl group may be substituted with —CO— or may be substituted with an oxygen atom or —COO— in such a manner that oxygen atoms are not directly bonded to each other, P$^1$, P$^2$ and P$^3$ each independently represents a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a 1,2,3,4-tetrahydronaphthalene-2,6-diyl group, a 2,6-naphthylene group, an indane-2,5-diyl group, a phenanthrene-2,7-diyl group, a 9,10-dihydrophenanthrene-2,7-diyl group, a 1,2,3,4,4a,9,10a-octahydrophenanthrene-2,7-diyl group or a fluorene-2,7-diyl group, and the 1,4-phenylene group, the 1,2,3,4-tetrahydronaphthalene-2,6-diyl group, the 2,6-naphthylene group, the phenanthrene-2,7-diyl group, the 9,10-dihydrophenanthrene-2,7-diyl group, the 1,2,3,4,4a,9,10a-octahydrophenanthrene-2,7-diyl group and the fluorene-2,7-diyl group are not substituted or can have one, or two or more fluorine atoms, chlorine atoms, trifluoromethyl groups, trifluoromethoxy groups or methyl groups as a substituent, L$^1$ and L$^2$ represent a single bond, —COO—, —OCO—, —C≡C— or an alkylene group having 2 to 5 carbon atoms in which one, or two or more methylene groups existing in the group may be substituted with —CO— or may be substituted with an oxygen atom or —COO— in such a manner that oxygen atoms are not directly bonded to each other, and the alkylene group is not substituted or may have one, or two or more fluorine atoms, alkyl groups having 1 to 5 carbon atoms, trifluoromethyl groups, trifluoromethoxy groups or phenyl groups as a substituent, w is 0, 1 or 2, and when w is 2, the two groups $p^1$ or the two groups $L^1$ may be the same or different, and at least one of R', R", $L^1$ and $L^2$ is an optically active group, wherein a natural pitch at 25° C. is from 0.1 to 1000 µm.

15. The nematic or cholesteric liquid crystal composition according to claim 13, comprising one, or two or more kinds of compounds selected from the group consisting of compounds represented by the general formulas (II-a), (II-b) and (II-c):

$$R^2\text{-}A^4\text{-}Z^3\text{-}(A^5\text{-}Z^4)_p\text{-}(A^6\text{-}Z^5)_q\text{-}A^7\text{-}Z^6\text{-}CN \quad \text{(II-a)}$$

$$R^2\text{-}A^4\text{-}Z^3\text{-}(A^5\text{-}Z^4)_p\text{-}(A^6\text{-}Z^5)_q\text{-}A^7\text{-}Z^6\text{-}X^1 \quad \text{(II-b)}$$

$$R^2\text{-}A^4\text{-}Z^3\text{-}(A^5\text{-}Z^4)_p\text{-}(A^6\text{-}Z^5)_q\text{-}A^7\text{-}Z^6\text{-}R^3 \quad \text{(II-c)}$$

wherein $R^2$ and $R^3$ each independently represents an alkyl group having 1 to 10 carbon atoms or an alkenyl group having 2 to 10 carbon atoms, the alkyl group or the alkenyl group is not substituted or can have one, or two or more fluorine atoms, chlorine atoms, cyano groups, methyl groups or trifluoromethyl groups as a substituent, and one, or two or more methylene groups existing in the alkyl group or the alkenyl group may be substituted with —CO— or may be substituted with an oxygen atom or —COO— in such a manner that oxygen atoms are not directly bonded to each other, $A^4$, $A^5$, $A^6$ and $A^7$ each independently represents a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a 1,2,3,4-tetrahydronaphthalene-2,6-diyl group, a 2,6-naphthylene group, an indane-2,5-diyl group, a phenanthrene-2,7-diyl group, a 9,10-dihydrophenanthrene-2,7-diyl group, a 1,2,3,4,4a,9,10a-octahydrophenanthrene-2,7-diyl group or a fluorene-2,7-diyl group, and the 1,4-phenylene group, the 1,2,3,4-tetrahydronaphthalene-2,6-diyl group, the 2,6-naphthylene group, the phenanthrene-2,7-diyl group, the 9,10-dihydrophenanthrene-2,7-diyl group, the 1,2,3,4,4a,9,10a-octahydrophenanthrene-2,7-diyl group and the fluorene-2,7-diyl group are not substituted or can have one, or two or more fluorine atoms, chlorine atoms, trifluoromethyl groups, trifluoromethoxy groups or methyl groups as a substituent, $Z^3$, $Z^4$, $Z^5$ and $Z^6$ each independently represents a single bond, —CO—, —COO—, —OCO—, —CH=N—, —N=CH—, —C≡C—, —CH$_2$CH$_2$—, —CH$_2$CH$_2$CH$_2$—, —CH$_2$CH$_2$CH$_2$CH$_2$—, —CH$_2$O—, —OCH$_2$—, —CF$_2$O—, —OCF$_2$—, —CH=N—N=CH—, —CF=CF—, —CH=CH—, —CH$_2$CH$_2$CH=CH—, —CH=CHCH$_2$CH$_2$— or —CH$_2$CH=CHCH$_2$—, $X^1$ represents a fluorine atom, a chlorine atom, a trifluoromethyl group, a trifluoromethoxy group, a difluoromethoxy group or an isothiocyanate group, and p and q each independently represents 0 or 1.

16. The nematic or cholesteric liquid crystal composition according to claim 15, comprising compounds selected from the group consisting of compounds represented by the general formulas (III-a) to (III-j):

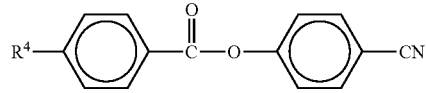
(III-a)

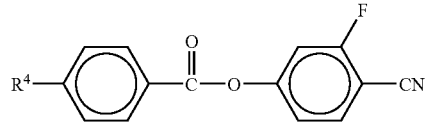
(III-b)

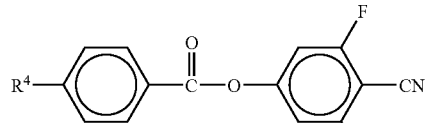
(III-c)

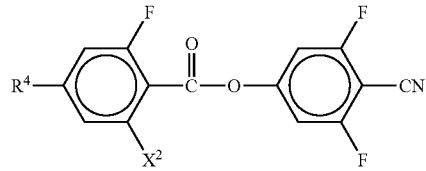
(III-d)

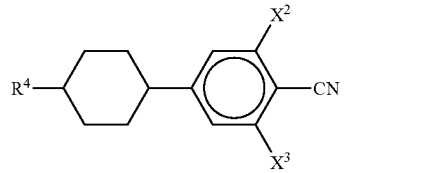
(III-e)

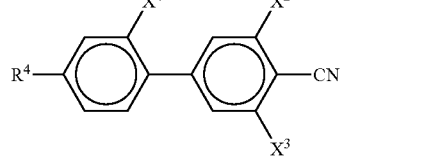
(III-f)

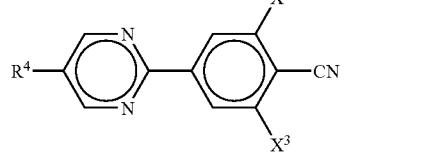
(III-g)

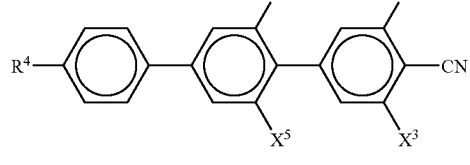
(III-h)

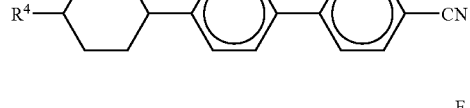
(III-i)

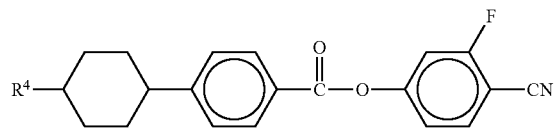
(III-j)

wherein R⁴ represents an alkyl group having 1 to 10 carbon atoms, an alkoxyl group having 1 to 10 carbon atoms, an alkenyl group having 2 to 10 carbon atoms or an alkenyloxy group having 2 to 10 carbon atoms, and $X^2$, $X^3$, $X^4$ and $X^5$ each independently represents a hydrogen atom, a fluorine atom or a chlorine atom.

17. The nematic or cholesteric liquid crystal composition according to claim 15, comprising compounds selected from the group consisting of compounds represented by the general formulas (IV-a) to (IV-k):

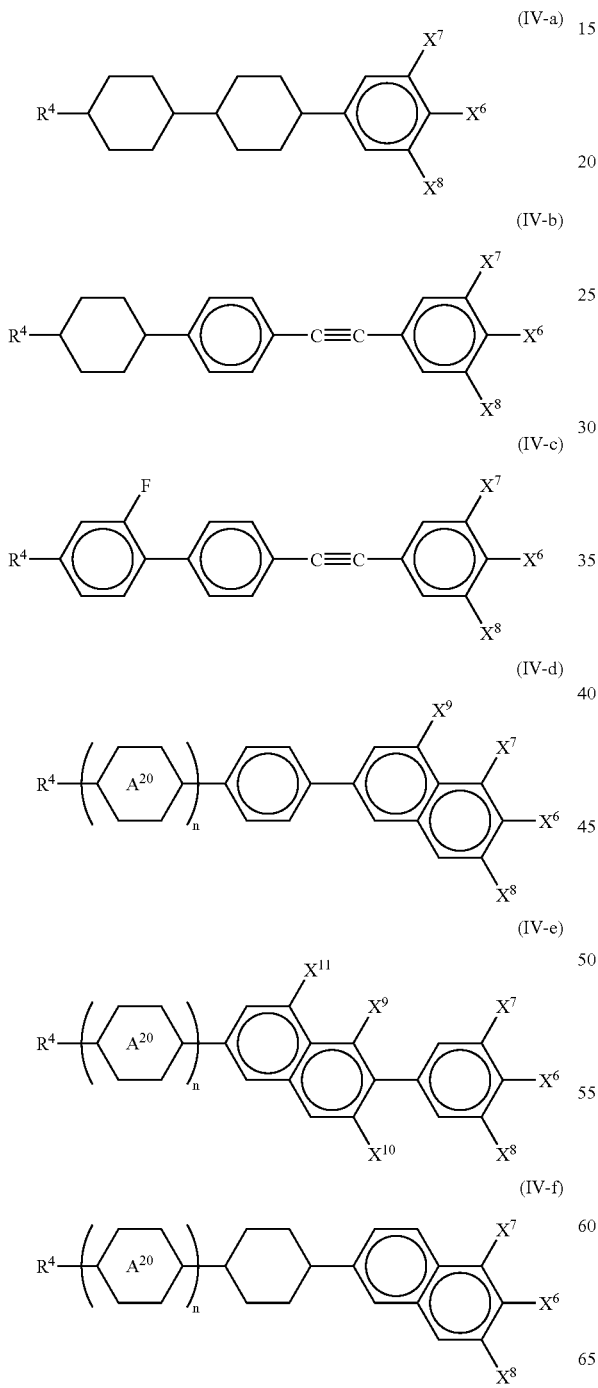
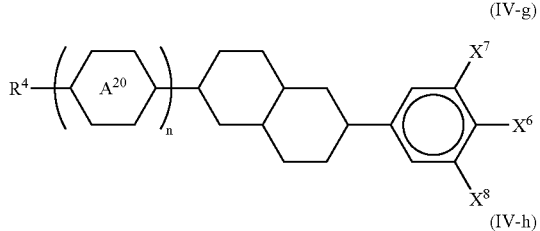
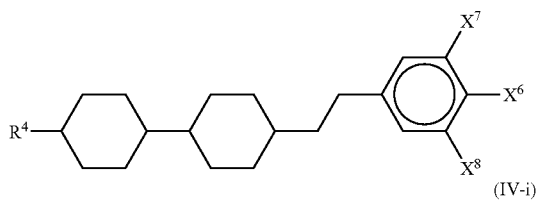
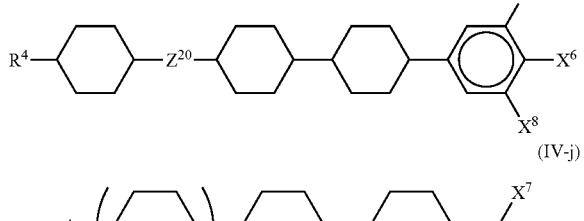
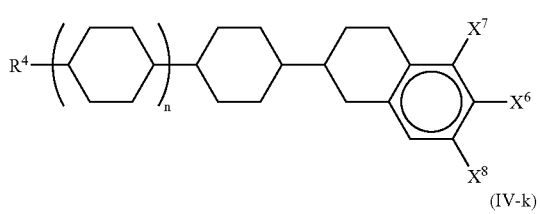
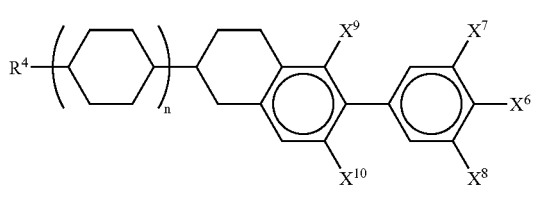

wherein R⁴ represents an alkyl group having 1 to 10 carbon atoms, an alkoxyl group having 1 to 10 carbon atoms, an alkenyl group having 2 to 10 carbon atoms or an alkenyloxy group having 2 to 10 carbon atoms, $A^{20}$ represents a 1,4-phenylene group or a 1,4-cyclohexylene group, $Z^{20}$ represents a single bond or —CH₂—CH₂—, $X^6$ represents a fluorine atom, a chlorine atom, a difluoromethoxy group or a trifluoromethoxy group, and $X^7$ to $X^{11}$ each independently represents a hydrogen atom, a fluorine atom or a chlorine atom.

18. The nematic or cholesteric liquid crystal composition according to claim 15, comprising compounds selected from the group consisting of compounds represented by the general formulas (V-a) to (V-n):

-continued

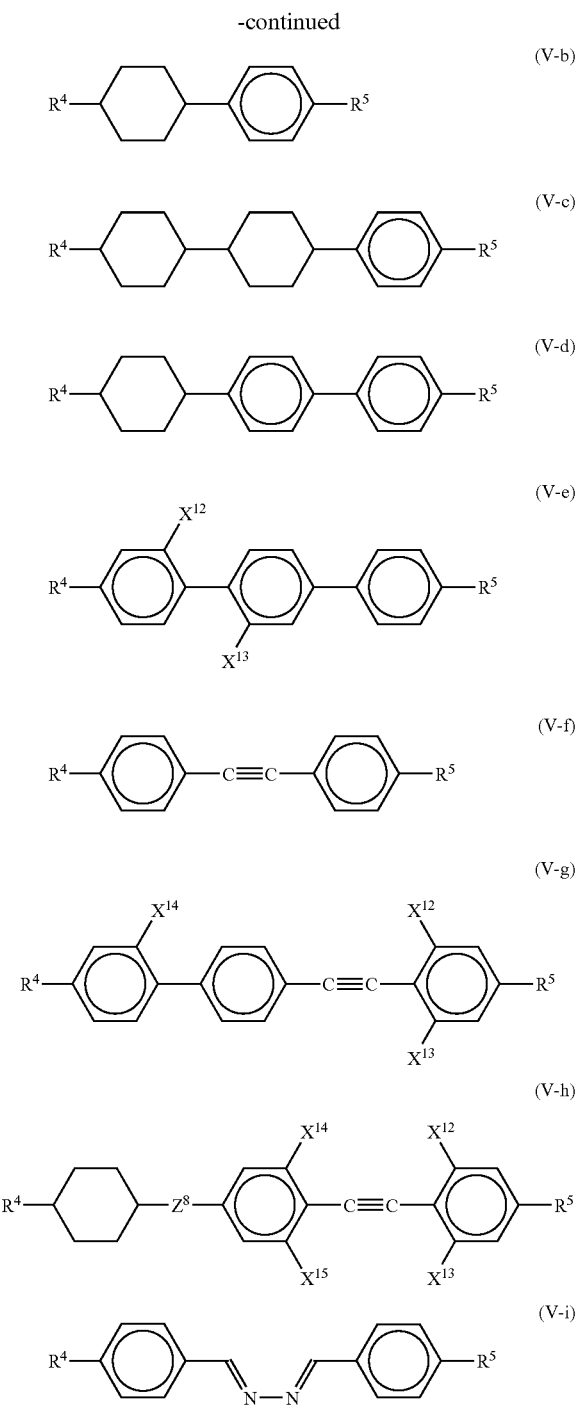

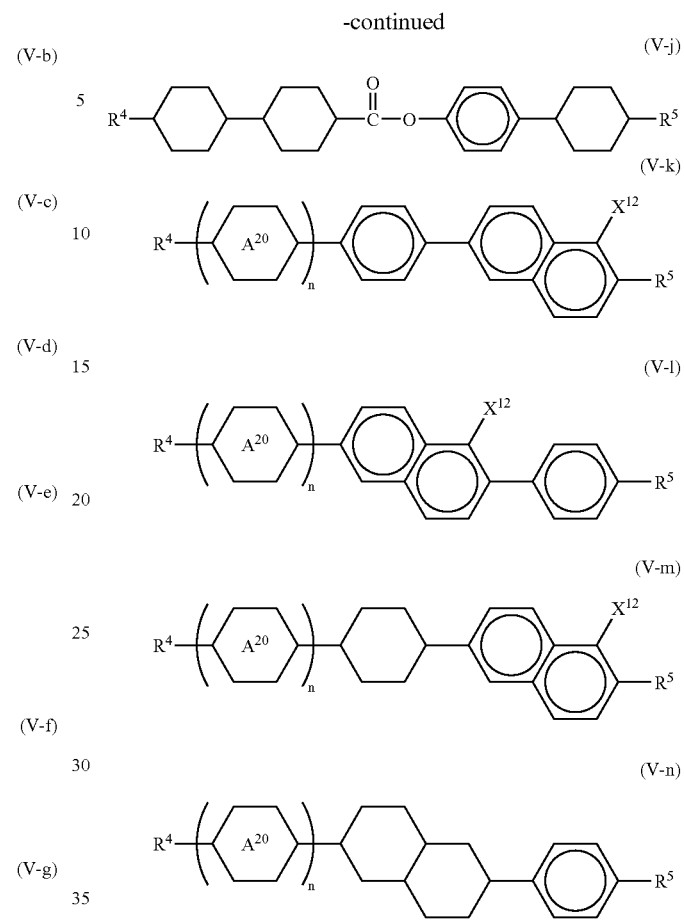

wherein $R^4$ and $R^5$ each independently represents an alkyl group having 1 to 10 carbon atoms, an alkoxyl group having 1 to 10 carbon atoms, an alkenyl group having 2 to 10 carbon atoms or an alkenyloxy group having 2 to 10 carbon atoms, $A^{20}$ represents a 1,4-phenylene group or a 1,4-cyclohexylene group, $Z^8$ represents a single bond, —$CH_2$—$CH_2$— or —COO—, and $X^{12}$ to $X^{15}$ each independently represents a hydrogen atom, a fluorine atom or a methyl group.

19. A liquid crystal display device using the liquid crystal composition of claim 13.

20. A TN or STN liquid crystal display device using the liquid crystal composition of claim 16 or 18.

21. An active driving liquid crystal display device using the liquid crystal composition of claim 17 or 18.

22. A cholesteric liquid crystal display device using the liquid crystal composition of claim 16 or 18.

* * * * *